United States Patent
Fan et al.

(10) Patent No.: US 10,326,559 B2
(45) Date of Patent: Jun. 18, 2019

(54) TECHNIQUES FOR ACKNOWLEDGMENT OF TRANSMISSIONS IN A WIRELESS COMMUNICATION SYSTEM

(71) Applicant: QUALCOMM Incorporated, San Diego, CA (US)

(72) Inventors: Zhifei Fan, San Diego, CA (US); Xiaoxia Zhang, San Diego, CA (US); Taesang Yoo, Riverside, CA (US); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 15/485,656

(22) Filed: Apr. 12, 2017

(65) Prior Publication Data
US 2017/0310426 A1 Oct. 26, 2017

Related U.S. Application Data

(60) Provisional application No. 62/325,274, filed on Apr. 20, 2016.

(51) Int. Cl.
*H04W 4/00* (2018.01)
*H04L 1/18* (2006.01)
(Continued)

(52) U.S. Cl.
CPC .......... *H04L 1/1812* (2013.01); *H04L 1/0013* (2013.01); *H04L 1/1664* (2013.01);
(Continued)

(58) Field of Classification Search
CPC ... H04L 1/0013; H04L 1/1812; H04L 1/1664; H04L 1/18; H04L 1/1861; H04L 1/1893;
(Continued)

(56) References Cited

U.S. PATENT DOCUMENTS 8,000,272 B2 * 8/2011 Gao ...................... H04W 72/14
370/280
8,705,468 B2 * 4/2014 Montojo ............... H04W 48/12
370/329
(Continued)

FOREIGN PATENT DOCUMENTS

WO  WO 2010/049584     * 5/2010
WO  WO-2011041623 A1    4/2011
WO  WO-2015141584 A1    9/2015

OTHER PUBLICATIONS

ISA/EP, International Search Report and Written Opinion of the International Searching Authority, Int'l Application No. PCT/US2017/027389, dated Jul. 10, 2017, European Patent Office, Rijswijk, NL, 18 pgs.

*Primary Examiner* — Frank Duong
(74) *Attorney, Agent, or Firm* — Holland & Hart LLP

(57) ABSTRACT

A base station may provide both an uplink grant and a downlink grant in a same transmission time interval (TTI), and may provide an indication in the uplink grant that the TTI includes the downlink grant. A user equipment (UE) that receives the uplink grant may provide feedback using identified feedback resources in an uplink shared channel, and other uplink transmissions may be rate matched around the feedback resources in the uplink shared channel. A base station receiving the feedback may monitor the feedback resources to determine whether the downlink grant or one or more of the downlink transmissions were successfully received at the UE. A base station, in some examples, may monitor different sets of resources to determine whether certain of the uplink grant, downlink grant, downlink transmissions associated with the downlink grant, or any combinations thereof, have been successfully received at the UE.

30 Claims, 18 Drawing Sheets

(51) Int. Cl.
*H04L 1/00* (2006.01)
*H04W 72/12* (2009.01)
*H04W 74/08* (2009.01)
*H04L 1/16* (2006.01)
*H04L 5/00* (2006.01)
*H04L 5/14* (2006.01)

(52) U.S. Cl.
CPC .......... *H04L 1/1861* (2013.01); *H04L 1/1893* (2013.01); *H04L 5/0044* (2013.01); *H04L 5/0055* (2013.01); *H04L 5/0094* (2013.01); *H04W 72/1289* (2013.01); *H04W 74/0808* (2013.01); *H04L 5/001* (2013.01); *H04L 5/0023* (2013.01); *H04L 5/14* (2013.01)

(58) Field of Classification Search
CPC ....... H04L 5/001; H04L 5/0023; H04L 5/003; H04L 5/0044; H04L 5/0055; H04L 5/0091; H04L 5/0094; H04L 5/14; H04W 72/005; H04W 72/12; H04W 72/1289; H04W 74/08; H04W 74/0808
See application file for complete search history.

(56) References Cited

U.S. PATENT DOCUMENTS

| | | |
|---|---|---|
| 2011/0280201 A1* | 11/2011 | Luo .................. H04W 72/0406 370/329 |
| 2013/0223299 A1 | 8/2013 | Yang et al. |
| 2013/0258914 A1 | 10/2013 | Seo et al. |
| 2017/0118728 A1* | 4/2017 | Harada .................. H04W 52/38 |
| 2018/0063820 A1* | 3/2018 | Xiong .................. H04W 72/042 |

* cited by examiner

TECHNIQUES FOR ACKNOWLEDGMENT OF TRANSMISSIONS IN A WIRELESS COMMUNICATION SYSTEM

CROSS REFERENCES

The present Application for Patent claims priority to U.S. Provisional Patent Application No. 62/325,274 by Fan, et al., entitled "Techniques For Acknowledgement of Transmissions in a Wireless Communication System," filed Apr. 20, 2016, assigned to the assignee hereof.

BACKGROUND

The following relates generally to wireless communication, and more specifically to acknowledgment of transmissions in a wireless communication system.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communication system may include a number of base stations, each simultaneously supporting communication for multiple communication devices, which may each be referred to as a user equipment (UE).

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

Reliability of wireless communications may be improved in some cases through feedback from a receiver to a transmitter that may indicate whether a transmission was successfully received. Such feedback may be hybrid automatic repeat request (HARD) feedback that may indicate an acknowledgment (ACK) or negative acknowledgment (NACK) of a transmission by a receiver, such as a UE or a base station. The transmitter that received the feedback may, in some cases, retransmit one or more transmissions having a NACK feedback. In some cases, feedback information may be transmitted using resources in a control channel. In other cases, such feedback information may be transmitted using resources in a shared channel, where an amount of resources used for the feedback information may be dependent upon the amount of feedback provided. In cases where there may be uncertainty in a location of feedback or an amount of feedback, the device receiving the feedback may need to perform blind decoding of different sets of resources to determine the feedback. Such blind decoding may consume resources and increase time for determining the feedback. Thus, it may be desirable in some cases to reduce an amount of blind decoding for determination of feedback information.

SUMMARY

The described techniques relate to improved methods, systems, devices, or apparatuses that support acknowledgment of transmissions in a wireless communication system. In some examples, described techniques provide that if a base station transmits both an uplink grant and a downlink grant to a same user equipment (UE) in a same downlink transmission time interval (TTI), an indication of the downlink grant may be included in the uplink grant. A UE that receives the uplink grant may use the indication of the downlink grant to determine resources to use for transmitting feedback to acknowledge successful receipt of the downlink grant, downlink transmissions, or any combination thereof.

In some examples, a UE may be configured to transmit feedback indicating successful or unsuccessful receipt of downlink transmissions (e.g., physical downlink shared channel (PDSCH) transmissions), or successful or unsuccessful receipt of the downlink grant and/or downlink transmissions, using a first subset of uplink resources, and to transmit other uplink transmissions (e.g., physical uplink shared channel (PUSCH) transmissions) using a second subset of uplink resources that are rate matched around the first subset of uplink resources. In some examples, the first subset of uplink resources may be configured to include a same subset of resources irrespective of an amount of feedback data to be transmitted. A base station receiving the feedback may simply monitor the first subset of uplink resources to determine feedback, rather than attempting to perform blind decoding for multiple candidates of resources that may contain the feedback information.

A method of wireless communication is described. The method may include determining that a transmission time interval (TTI) includes downlink resources for a downlink transmission to a user equipment (UE) and uplink resources for an uplink shared channel transmission from the UE, and transmitting an uplink grant to the UE indicating the uplink resources and indicating that the TTI includes the downlink transmission to the UE.

An apparatus for wireless communication is described. The apparatus may include means for determining that a TTI includes downlink resources for a downlink transmission to a UE and uplink resources for an uplink shared channel transmission from the UE, and means for transmitting an uplink grant to the UE indicating the uplink resources and indicating that the TTI includes the downlink transmission to the UE.

A further apparatus is described. The apparatus may include a processor, memory in electronic communication with the processor, and instructions stored in the memory. The instructions may be operable to cause the processor to determine that a TTI includes downlink resources for a downlink transmission to a UE and uplink resources for an uplink shared channel transmission from the UE, and transmit an uplink grant to the UE indicating the uplink resources and indicating that the TTI includes the downlink transmission to the UE.

A non-transitory computer readable medium for wireless communication is described. The non-transitory computer-readable medium may include instructions to cause a processor to determine that a TTI includes downlink resources for a downlink transmission to a UE and uplink resources for an uplink shared channel transmission from the UE, and transmit an uplink grant to the UE indicating the uplink resources and indicating that the TTI includes the downlink transmission to the UE.

Some examples of the method, apparatus, or non-transitory computer-readable medium described above may further include processes, features, means, or instructions for transmitting a downlink grant to the UE indicating the downlink resources. Some examples of the method, apparatus, or non-transitory computer-readable medium described above may further include processes, features, means, or instructions for transmitting the downlink transmission to the UE. Some examples of the method, apparatus, or non-transitory computer-readable medium described above may further include processes, features, means, or instructions for monitoring for acknowledgment receipt feedback indicating successful receipt of one or more of the downlink grant, the uplink grant, or the downlink transmission.

In some examples of the method, apparatus, or non-transitory computer-readable medium described above, monitoring for the acknowledgment receipt feedback comprises: monitoring an uplink control channel resource for acknowledgment receipt feedback indicating successful receipt of the downlink grant and unsuccessful receipt of the uplink grant. Some examples of the method, apparatus, or non-transitory computer-readable medium described above may further include processes, features, means, or instructions for monitoring an uplink shared channel resource for acknowledgment receipt feedback indicating: successful receipt of the uplink grant and one or more of the downlink grant or at least a portion of the downlink transmission, or successful receipt of the uplink grant and unsuccessful receipt of the downlink grant.

Some examples of the method, apparatus, or non-transitory computer-readable medium described above may further include processes, features, means, or instructions for configuring the UE with a fixed payload size for acknowledgment feedback transmitted using the uplink shared channel resource.

In some examples of the method, apparatus, or non-transitory computer-readable medium described above, monitoring for the acknowledgment receipt feedback comprises: monitoring an uplink control channel resource of the TTI for acknowledgment receipt feedback indicating successful receipt of one or more of the downlink grant or the uplink grant. Some examples of the method, apparatus, or non-transitory computer-readable medium described above may further include processes, features, means, or instructions for monitoring an uplink shared channel resource subsequent to the uplink control channel resource for acknowledgment receipt feedback indicating successful receipt of at least a portion of the downlink transmission.

A method of wireless communication is described. The method may include receiving an uplink grant that indicates uplink resources for an uplink shared channel transmission and a presence of a downlink grant in a same TTI as the uplink shared channel transmission, and determining acknowledgment feedback for one or more of the downlink grant or a downlink transmission based at least in part on the uplink grant.

An apparatus for wireless communication is described. The apparatus may include means for receiving an uplink grant that indicates uplink resources for an uplink shared channel transmission and a presence of a downlink grant in a same TTI as the uplink shared channel transmission, and means for determining acknowledgment feedback for one or more of the downlink grant or a downlink transmission based at least in part on the uplink grant.

A further apparatus is described. The apparatus may include a processor, memory in electronic communication with the processor, and instructions stored in the memory. The instructions may be operable to cause the processor to receive an uplink grant that indicates uplink resources for an uplink shared channel transmission and a presence of a downlink grant in a same TTI as the uplink shared channel transmission, and determine acknowledgment feedback for one or more of the downlink grant or a downlink transmission based at least in part on the uplink grant.

A non-transitory computer readable medium for wireless communication is described. The non-transitory computer-readable medium may include instructions to cause a processor to receive an uplink grant that indicates uplink resources for an uplink shared channel transmission and a presence of a downlink grant in a same TTI as the uplink shared channel transmission, and determine acknowledgment feedback for one or more of the downlink grant or a downlink transmission based on the uplink grant.

Some examples of the method, apparatus, or non-transitory computer-readable medium described above may further include processes, features, means, or instructions for transmitting the acknowledgment feedback. Some examples of the method, apparatus, or non-transitory computer-readable medium described above may further include processes, features, means, or instructions for rate matching the uplink shared channel transmission around the acknowledgment feedback.

In some examples of the method, apparatus, or non-transitory computer-readable medium described above, determining the acknowledgment feedback comprises: determining that the downlink grant is not successfully received. Some examples of the method, apparatus, or non-transitory computer-readable medium described above may further include processes, features, means, or instructions for generating a negative acknowledgment (NACK) that indicates the downlink grant was not successfully received.

Some examples of the method, apparatus, or non-transitory computer-readable medium described above may further include processes, features, means, or instructions for receiving the downlink grant, where the downlink grant indicates resources for downlink transmissions in the same TTI as the uplink shared channel transmission. Some examples of the method, apparatus, or non-transitory computer-readable medium described above may further include processes, features, means, or instructions for attempting to receive and decode information in the downlink transmissions.

In some examples of the method, apparatus, or non-transitory computer-readable medium described above, determining the acknowledgment feedback comprises: determining that the information in the downlink transmissions is successfully received and decoded. Some examples of the method, apparatus, or non-transitory computer-readable medium described above may further include processes, features, means, or instructions for generating an acknowledgment/negative-acknowledgment (ACK/NACK) that indicates the first portion of the information in the downlink transmissions was successfully received.

Some examples of the method, apparatus, or non-transitory computer-readable medium described above may further include processes, features, means, or instructions for transmitting the ACK/NACK using a first subset of the uplink resources. Some examples of the method, apparatus, or non-transitory computer-readable medium described above may further include processes, features, means, or instructions for transmitting the uplink shared channel transmission using a second subset of the uplink resources that are rate matched around the first subset of the uplink resources.

In some examples of the method, apparatus, or non-transitory computer-readable medium described above, determining the acknowledgment feedback further comprises: performing a cyclic redundancy check (CRC) on the ACK/NACK to identify CRC information. Some examples of the method, apparatus, or non-transitory computer-readable medium described above may further include processes, features, means, or instructions for including the CRC information with the acknowledgment feedback.

In some examples of the method, apparatus, or non-transitory computer-readable medium described above, determining the acknowledgment feedback comprises: identifying a first subset of the uplink resources for the acknowledgment feedback. Some examples of the method, apparatus, or non-transitory computer-readable medium described above may further include processes, features, means, or instructions for identifying a second subset of the uplink resources that are rate matched around the first subset of the uplink resources.

In some examples of the method, apparatus, or non-transitory computer-readable medium described above, the first subset of the uplink resources are identified irrespective of an amount of data in the acknowledgment feedback.

In some examples of the method, apparatus, or non-transitory computer-readable medium described above, determining the acknowledgment feedback comprises: identifying control channel resources for acknowledging receipt of the downlink grant and the downlink transmission in a first subframe. Some examples of the method, apparatus, or non-transitory computer-readable medium described above may further include processes, features, means, or instructions for determining that the downlink grant was not successfully received. Some examples of the method, apparatus, or non-transitory computer-readable medium described above may further include processes, features, means, or instructions for transmitting a negative acknowledgment of the receipt of the downlink grant in the control channel resources.

Some examples of the method, apparatus, or non-transitory computer-readable medium described above may further include processes, features, means, or instructions for performing a listen-before-talk (LBT) procedure. Some examples of the method, apparatus, or non-transitory computer-readable medium described above may further include processes, features, means, or instructions for transmitting the uplink shared channel transmission using the uplink resources indicated in the uplink grant.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
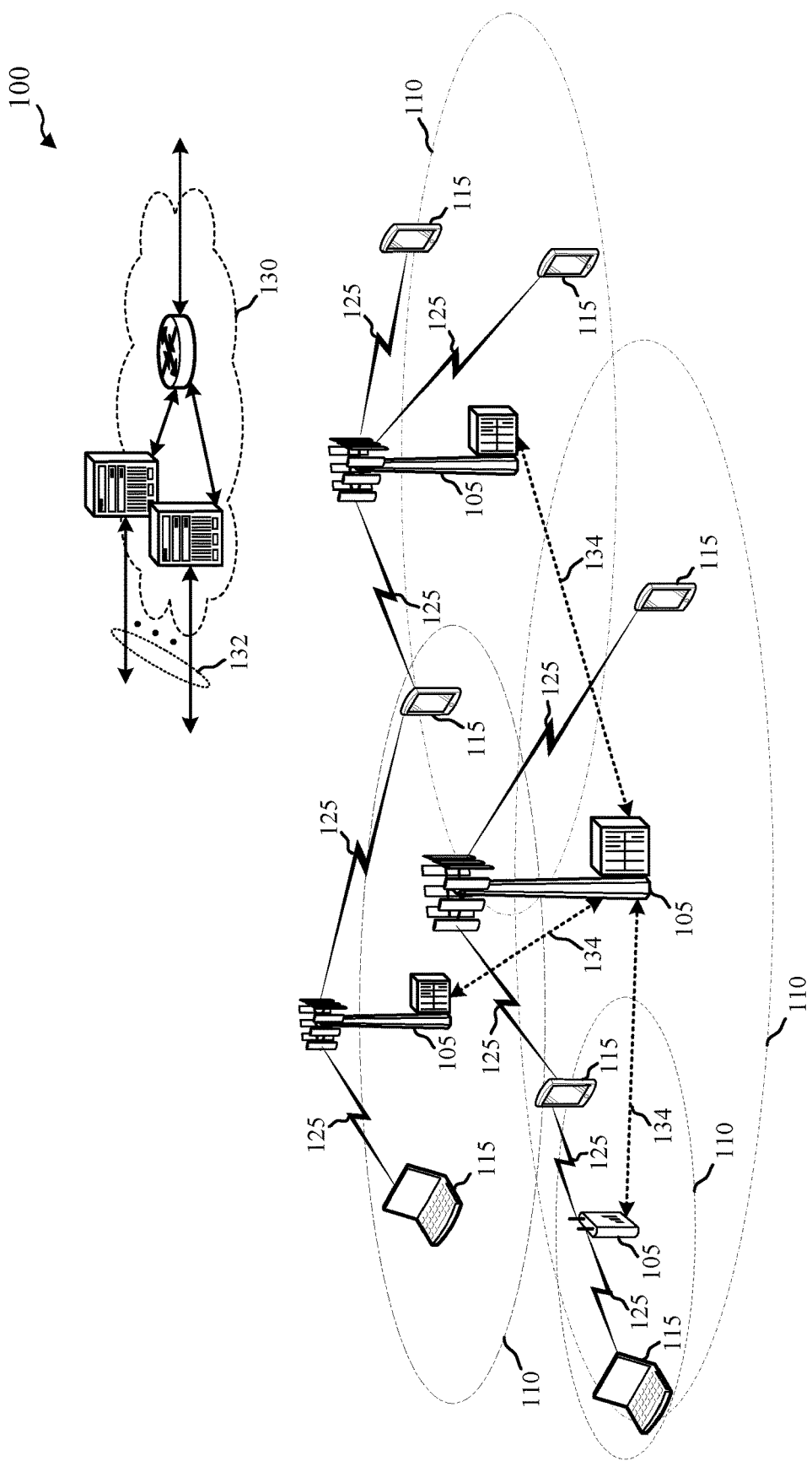
FIG. 1 illustrates an example of a wireless communication system that supports acknowledgment of transmissions in accordance with aspects of the present disclosure.

The present disclosure provides techniques for acknowledgment of transmissions in wireless communication systems. As indicated above, in some scenarios a base station may provide both an uplink grant and a downlink grant in a same transmission time interval (TTI). In some cases, the base station may provide an indication that the TTI includes the downlink grant in the uplink grant. A user equipment (UE) that receives the uplink grant may provide feedback using identified feedback resources in an uplink shared channel, and other uplink transmissions may be rate matched around the feedback resources in the uplink shared channel. A base station receiving the feedback may simply monitor the feedback resources to determine whether the downlink grant or one or more of the downlink transmissions were successfully received at the UE. A base station, in some examples, may monitor different sets of resources to determine whether the uplink grant, downlink grant, downlink transmissions associated with the downlink grant, or any combinations thereof, have been successfully received at the UE.

At the UE, if both the downlink grant and uplink grant are not successfully received, the UE may not transmit any uplink transmissions. Based on the lack of any uplink transmissions, the base station may determine that neither of the downlink grant nor uplink grant were successfully received at the UE. If the UE successfully receives both downlink grant and the uplink grant, the UE may transmit feedback (e.g., hybrid automatic repeat request (HARQ) acknowledgment/negative-acknowledgment (ACK/NACK) feedback) on reception of downlink transmissions associated with the downlink grant on an uplink shared channel (e.g., a physical uplink shared channel (PUSCH)), and an uplink transmission payload associated with the uplink grant may be rate matched around a feedback payload.

If the UE successfully receives the downlink grant, but does not successfully receive the uplink grant, then the UE may transmit feedback (e.g., HARQ ACK/NACK feedback) indicating successful or unsuccessful receipt of the associated downlink transmissions using control channel resources (e.g., physical uplink control channel (PUCCH) resources). The presence of the feedback on the control channel resources may indicate to the base station that the uplink grant was not successfully received.

If the UE misses the downlink grant and successfully receives the uplink grant, the UE may determine from an indicator in the uplink grant that there is a downlink grant that has been missed. The UE may transmit a NACK feedback for the downlink grant, and transmit the NACK feedback using the same uplink shared channel resources that would have been used if the downlink grant had been received. Thus, in such a case, the UE will act as if the downlink grant was received, and the uplink transmissions associated with the uplink grant may be rate matched around the NACK feedback in a similar manner as if the downlink grant were successfully received. In some examples, the payload size for the feedback is fixed when it is transmitted on shared channel resources, to avoid rate matching ambiguity. The presence of the NACK feedback on the shared channel resources may indicate to the base station that the uplink grant was successfully received and that the downlink grant was not successfully received.

At the base station, both the control channel and the shared channel resources may be monitored, and a determination made on successful receipt of the uplink grant, downlink grant, downlink transmissions, or any combination thereof. On the shared channel resources, in some examples, there is no rate matching ambiguity as the payload size is fixed irrespective of whether the feedback includes information on the downlink transmissions or the NACK feedback indicating that the downlink grant was missed. Thus, the base station only needs to check one hypothesis when performing blind decoding.

In some examples, uplink transmissions by a UE may have control channel resources and shared channel resources time division multiplexed, in which control channel resources (e.g., PUCCH resources) may be allocated followed by shared channel resources (e.g., PUSCH resources). For example, all or a portion of a first subframe may be allocated for uplink control channel transmissions. Any remaining portion of the first subframe, and one or more subsequent subframes, may be allocated for uplink shared channel transmissions. In some cases, the uplink resources may be resources of a shared radio frequency spectrum band and a listen before talk (LBT) procedure (e.g., a clear channel assessment (CCA)) may be performed by a UE or base station prior to transmitting each subframe.

In such examples, a base station may, similarly as discussed above, transmit an indication of a downlink grant in an uplink grant for cases where both the downlink grant and uplink grant occur in a same TTI. At the UE, if both the downlink grant and uplink grant are missed, the UE will not transmit anything and the base station may determine that both grants were missed. If both the downlink grant and uplink grant are received, the UE may transmit feedback for the downlink transmissions on control channel resources in a first uplink subframe, may transmit additional band occupancy control channel or shared channel transmissions, if any, on the first subframe, and transmit shared channel transmissions in a subsequent subframe after a LBT procedure. If the UE receives the downlink grant but misses the uplink grant, the UE may transmit feedback on the downlink transmissions using control channel resources of the first subframe. If the UE misses the downlink grant but receives the uplink grant, the UE may determine from the uplink grant that there is a downlink grant that was missed. The UE in such a case, may generate a discontinuous transmission (DTX) indicator, or a NACK, transmit the DTX indicator or NACK on control channel resources in the first subframe, transmit additional band occupancy control channel or shared channel transmissions (if any) on the first subframe, and transmit the shared channel transmissions in a subsequent subframe after a LBT procedure. The base station, in such examples, may monitor both the control channel resources and shared channel resources, and determine successful receipt of the uplink grant, downlink grant, downlink transmissions, or any combination thereof.

Aspects of the disclosure are initially described in the context of a wireless communication system. Acknowledgment of transmission schemes that provide an indication of a downlink grant in an uplink grant are discussed, in addition to examples of different resources that may carry acknowledgement feedback. Aspects of the disclosure are further illustrated by and described with reference to apparatus diagrams, system diagrams, and flowcharts that relate to reference signal transmission in wireless communications with multiple receivers.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be an LTE, LTE-A network, or a New Radio (NR) network. In some cases, wireless communication system 100 may support enhanced broadband communications, ultra-reliable (e.g., mission critical) communications, low latency communications, and communications with low-cost and low-complexity devices. Wireless communication system 100 may support acknowledgment of transmission schemes that provide an indication of a downlink grant in an uplink grant, and that allow efficient blind decoding of monitored resources to determine feedback for different downlink transmissions.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. UEs 115 may be dispersed throughout the wireless communication system 100, and each UE 115 may be stationary or mobile.

A UE 115 may be referred to as a mobile station, a subscriber station, a remote unit, a wireless device, an access terminal (AT), a handset, a user agent, a client, or like terminology. A UE 115 may also be a cellular phone, a personal digital assistant (PDA), a wireless modem, a wireless communication device, a handheld device, a tablet computer, a laptop computer, a cordless phone, a personal electronic device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communication system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors.

Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices (e.g., UEs 115 and base station 105) operating in mmW spectrum may have multiple antennas to allow beamforming. That is, a base station 105 may use multiple antennas or antenna arrays to conduct beamforming operations for directional communications with a UE 115. Beamforming (which may also be referred to as spatial filtering) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station) and a receiver (e.g., a UE), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may utilize multiple beams (e.g., antenna subarrays) while receiving the synchronization or other directional signals.

In some cases, wireless communication system 100 may utilize enhanced component carriers. An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

In some cases, a UE 115 or base station 105 may operate in a shared or unlicensed frequency spectrum. These devices may access the radio frequency spectrum using a contention-based access technique, such as a LBT scheme. For example, a UE 115 or base station 105 may perform a CCA prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

Some LTE deployments may define that, if uplink ACK/NACK (to acknowledge the reception of PDSCH) and PUSCH are transmitted in a same subframe, ACK/NACK will be transmitted on PUSCH. At a UE 115 in such deployments, if both the downlink and uplink grant are missed, no uplink transmissions will be transmitted. If a the downlink grant is received, the UE 115 may prepare to transmit ACK/NACK, and if there is no PUSCH at the same subframe (e.g., the uplink grant is missed), the UE 115 may send ACK/NACK on PUCCH. If the uplink grant is received, the UE 115 may prepare to transmit the PUSCH, and if there is ACK/NACK at the same subframe, the UE 115 may puncture the corresponding tones on the two sides of a demodulation reference signal (DMRS) to transmit ACK/NACK. At a base station 105 in such deployments, blind detection is needed if both the downlink and uplink grants are sent to the same UE 115, and the base station 105 may monitor the PUSCH resource to see whether there are any PUSCH and ACK/NACK transmitted, and may monitor the PUCCH resource to see whether there are any ACK/NACK transmitted. When monitoring the PUSCH resources, the base station 105 may need to perform multiple blind decoding procedures based on potential payload sizes of the ACK/NACK feedback. In LTE, ACK/NACK may be transmitted at a subframe level, and thus relatively few bits of ACK/NACK payload may be present. Thus, blind decoding in such cases may be relatively easily performed.

Some eCC deployments may define that ACK/NACK feedback is to be provided on a code block (CB) level. In some cases, an ACK/NACK payload may have up to 40 bits of payload. Additionally, a cyclic redundancy check (CRC) may be performed and CRC bits (e.g., 24 CRC bits) may be added to the ACK/NACK payload. In the event that PUCCH is configured to be piggybacked on PUSCH when they are transmitted at the same burst, PUSCH may be rate matched around the PUCCH payload. Due to the size of the payload associated with ACK/NACK feedback, blind decoding of different potential sizes of feedback payload may not be desirable, due to the time and computational resources used for such multiple blind decoding procedures. In some examples of the present disclosure, techniques for acknowledgment feedback may avoid ambiguity in resources used for ACK/NACK feedback in shared channel transmissions.

As indicated above, in some examples, a base station 105 may provide both an uplink grant and a downlink grant in a same transmission time interval (TTI) to a UE 115. In some cases, the base station 105 may provide an indication that the TTI includes the downlink grant in the uplink grant. A UE 115 that receives the uplink grant may provide feedback using identified feedback resources in an uplink shared channel, and other uplink transmissions may be rate matched around the feedback resources in the uplink shared channel. The base station 105 receiving the feedback may simply monitor the feedback resources to determine whether the downlink grant or one or more of the downlink transmissions were successfully received at the UE 115. The base station 105, in some examples, may monitor different sets of resources to determine whether the uplink grant, downlink grant, downlink transmissions associated with the downlink grant, or any combinations thereof, have been successfully received at the UE 115.

Figure 2:
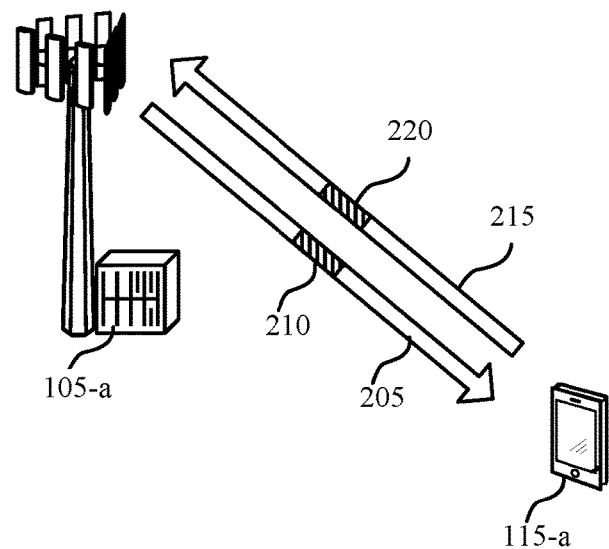
FIG. 2 illustrates an example of a wireless communication system that supports acknowledgment of transmissions in accordance with aspects of the present disclosure.

FIG. 2 illustrates an example of a wireless communication system 200 for acknowledgment feedback. Wireless communication system 200 may include base station 105-*a* and UE 115-*a*, which may be examples of the corresponding devices described with reference to FIG. 1. Base station 105-*a* may transmit downlink transmissions 205 to, and receive uplink transmissions 215 from, UE 115-*a* (and one or more other UEs if present). As indicated above, in some examples downlink transmissions 205 may include an uplink grant 210 that may include an indication of a downlink grant to the UE 115-*a* within a same downlink TTI. In some examples, the uplink transmissions 215 may include feedback information 220 that indicates successful or unsuccessful receipt of the uplink grant 210, a downlink grant, one or more downlink shared channel transmissions, or any combination thereof (e.g., HARQ ACK/NACK feedback).

In some examples, UE 115-*a* may receive the uplink grant 210 and may provide feedback information 220 using feedback resources in an uplink shared channel, and other uplink transmissions may be rate matched around the feedback resources in the uplink shared channel. In some cases, UE 115-*a* may miss the uplink grant 210, but may receive a downlink grant and one or more downlink transmissions associated with the downlink grant. The UE 115-*a* in such cases, may provide feedback information 220 using feedback resources in an uplink shared channel. The base station 105-*a*, in some examples, may simply monitor the shared channel and control channel feedback resources to determine whether the downlink grant or one or more of the downlink transmissions were successfully received at the UE. In some examples, the base station 105-*a* may determine whether certain of the uplink grant, downlink grant, downlink transmissions, or any combinations thereof, have been successfully received at the UE 115-*a* based on the resources used for the feedback information 220 and the content of the feedback information 220.

For example, if the UE 115-*a* misses both the uplink grant 210 and downlink grant, the UE 115-*a* may not transmit any uplink transmissions 215, and the base station 105-*a* may determine that neither of the downlink grant nor uplink grant were successfully received at the UE 115-*a* based on the lack of any uplink transmissions 215. If the UE 115-*a* successfully receives both the downlink grant and the uplink grant 210, the UE 115-*a* may transmit the feedback information 220 on an uplink shared channel (e.g., PUSCH), and the uplink transmission payload (e.g., PUSCH transmissions) associated with the uplink grant may be rate matched around the feedback information 220.

If the UE 115-*a* successfully receives the downlink grant, but does not successfully receive the uplink grant 210, then the UE 115-*a* may transmit the feedback information 220 indicating successful or unsuccessful receipt of the associated downlink transmissions using control channel resources (e.g., PUCCH). The presence of the feedback information 220 on the control channel resources may indicate to the base station 105-*a* that the uplink grant 210 was not successfully received but that the downlink grant and one or more of the downlink transmissions may have been successfully received. If the UE 115-*a* misses the downlink grant and successfully receives the uplink grant 210, the UE 115-*a* may determine from the indicator in the uplink grant 210 that there is a downlink grant that has been missed. The UE 115-*a* may transmit a NACK feedback for the downlink grant using the same uplink shared channel resources that would have been used for feedback information 220 if the downlink grant had been received. Thus, in such a case, the UE 115-*a* will act as if the downlink grant was received, and the uplink transmissions associated with the uplink grant 210 may be rate matched around the NACK feedback in a similar manner as if the downlink grant were successfully received. In some examples, the payload size for the feedback information 220 is fixed when transmitted on shared channel resources, to avoid rate matching ambiguity. The presence of the NACK feedback on the shared channel resources may indicate to the base station 105-*a* that the uplink grant 210 was successfully received and that the downlink grant was not successfully received.

At the base station 105-*a*, both the control channel and the shared channel resources may be monitored, and a determination made on successful receipt of the uplink grant 210, downlink grant, downlink transmissions 205, or any combination thereof. On the shared channel resources, in some examples, there is no rate matching ambiguity as the payload size of the feedback information 220 is fixed irrespective of whether the feedback information 220 includes information on the downlink transmissions or the NACK feedback indicating that the downlink grant was missed. Thus, the base station 105-*a* only needs to check one hypothesis when performing blind decoding.

Also as indicated above, in some examples, uplink transmissions 215 by a UE 115-*a* may have control channel resources and shared channel resources time division multiplexed, in which control channel resources (e.g., PUCCH resources) may be allocated followed by shared channel resources (e.g., PUSCH resources). For example, all or a portion of a first subframe may be allocated for uplink control channel transmissions. Any remaining portion of the first subframe, and one or more subsequent subframes, may be allocated for uplink shared channel transmissions. In some cases, the uplink resources may be resources of a shared radio frequency spectrum band and a LBT procedure (e.g., a CCA) may be performed by UE 115-*a* or base station 105-*a* prior to transmitting each subframe. In such examples, a base station 105-*a* may, similarly as discussed above, transmit an indication of a downlink grant in uplink grant 210 for cases where both the downlink grant and uplink grant occur in a same TTI. The UE 115-*a* may transmit feedback information 220, and the base station 105-*a* may monitor both control channel resources and shared channel resources, and determine successful receipt of the uplink grant 210, downlink grant, downlink transmissions 205, or any combination thereof, in a similar manner as discussed above.

Figure 3A:
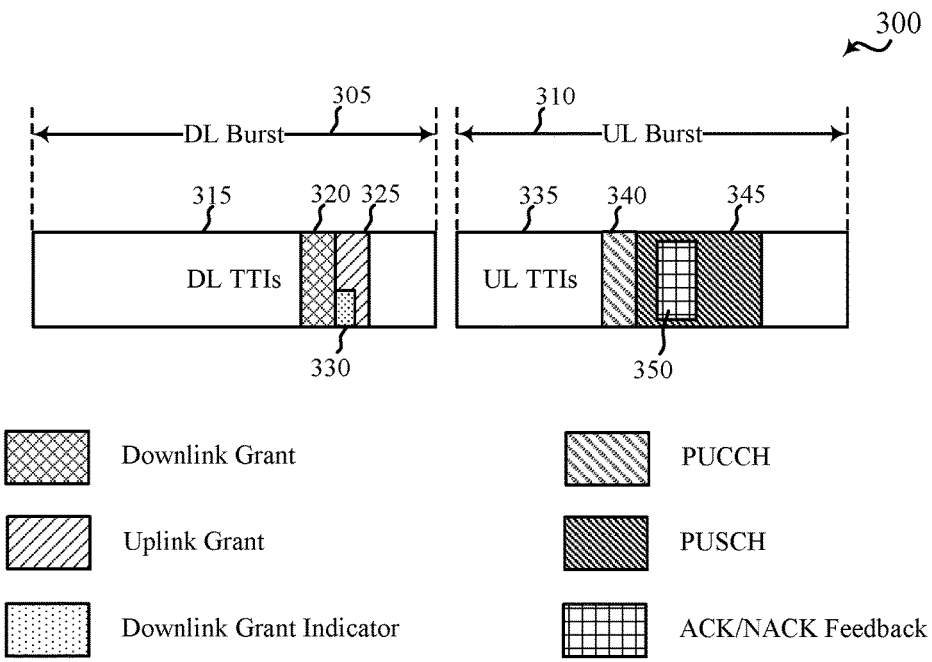
FIG. 3A illustrates an example of uplink and downlink resources that support acknowledgment of transmissions in accordance with aspects of the present disclosure.

FIG. 3A illustrates an example of downlink and uplink resources 300 that support acknowledgment of transmissions in wireless communication systems. In some cases, downlink and uplink resources 300 may be transmitted using aspects of techniques performed by a UE 115 or base station 105 as described with reference to FIGS. 1-2. Downlink and uplink resources 300 may include a downlink burst 305 and an uplink burst 310. Downlink burst 305 may include a number of downlink TTIs 315. Similarly, uplink burst 310 may include a number of uplink TTIs 335.

Within the downlink burst 305, in some examples, may be a downlink grant 320 that may allocate downlink resources within one or more downlink TTIs 315 to a UE. Also within the downlink burst 305 may be an uplink grant 325 that may allocate uplink resources within one or more uplink TTIs 335 for uplink transmissions from the UE to a base station. The base station, when configuring the uplink grant 325, may identify that both the downlink grant 320 and uplink grant 325 are located within the same downlink burst 305, and may set a downlink grant indicator 330 in the uplink grant 325. The downlink grant indicator 330 may, in some examples, be a one-bit indicator that indicates the presence of both the downlink grant 320 and the uplink grant 325 as being within the same downlink burst 305.

The UE may attempt to receive transmissions in the downlink burst 305 and generate feedback information in a manner similarly as discussed above. The feedback information may be transmitted using PUCCH resources 340, for example, in the event that the UE receives the downlink grant 320 but does not successfully receive the uplink grant 325. The UE may transmit uplink data in PUSCH resources 345 if the UE does successfully receive the uplink grant 325, which may be rate matched around ACK/NACK feedback 350 that may indicate feedback information for the downlink grant 320 reception or reception of one or more other downlink transmissions (e.g., PDSCH transmissions to the UE as allocated in the downlink grant 320).

Figure 3B:
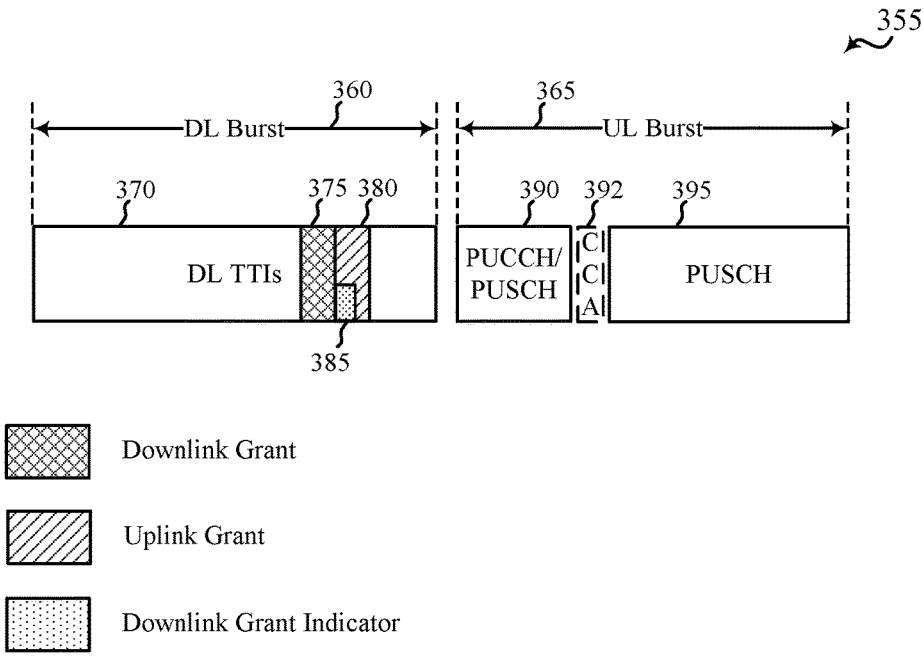
FIG. 3B illustrates another example of uplink and downlink resources that support acknowledgment of transmissions in accordance with aspects of the present disclosure.

FIG. 3B illustrates an example of uplink and downlink resources 355 that support acknowledgment of transmissions in wireless communication systems. In some cases, downlink and uplink resources 300 may be transmitted using aspects of techniques performed by a UE 115 or base station 105 as described with reference to FIGS. 1-2. Downlink and uplink resources 300 may include a downlink burst 360 and an uplink burst 365. Downlink burst 360 may include a number of downlink TTIs 370. In the example of FIG. 3B, uplink burst 365 may have time division multiplexed PUCCH resources and PUSCH resources. For example, all or a portion of a first uplink subframe 390 may be allocated for PUCCH transmissions, with any remaining portion of the first uplink subframe 390, and one or more subsequent uplink subframes 395, allocated for PUSCH transmissions. In some cases, the uplink resources may be resources of a shared radio frequency spectrum band and a CCA 392 may be performed by a UE prior to transmitting the subsequent uplink subframe 395.

Similarly as discussed above, within the downlink burst 360, in some examples, may be a downlink grant 375, that may allocate downlink resources within one or more downlink TTIs 370 to a UE. Also within the downlink burst 360 may be an uplink grant 380 that may allocate uplink PUSCH resources within the uplink burst 365. The base station, when configuring the uplink grant 380, may identify that both the downlink grant 375 and uplink grant 380 are located within the same downlink burst 360, and may set a downlink grant indicator 385 in the uplink grant 380. The downlink grant indicator 385 may, in some examples, be a one-bit indicator that indicates the presence of both the downlink grant 375 and the uplink grant 380 as being within the same downlink burst 360.

The UE may attempt to receive transmissions in the downlink burst 360 and generate feedback information in a manner similarly as discussed above. The feedback information may be transmitted using PUCCH resources in the first uplink subframe 390. At the UE, if both the downlink grant 375 and uplink grant 380 are missed, the UE will not transmit anything and the base station may determine that both grants were missed. If both the downlink grant 375 and uplink grant 380 are received, the UE may transmit feedback for the downlink transmissions on PUCCH resources in the first uplink subframe 390, may transmit additional band occupancy control channel or PUSCH transmissions, if any, on the first subframe 390, and transmit PUSCH transmissions in a subsequent subframe 395 after CCA procedure 392. If the UE receives the downlink grant 375 but misses the uplink grant 380, the UE may transmit feedback on the downlink transmissions using PUCCH resources of the first subframe 390. If the UE misses the downlink grant 375 but receives the uplink grant 380, the UE may determine from the downlink grant indicator 385 that there is a downlink grant that was missed. The UE in such a case, may generate a DTX indicator, or a NACK, transmit it on PUCCH resources in the first subframe 390, transmit additional band occupancy control channel or PUSCH transmissions (if any) on the first subframe 390, and transmit PUSCH transmissions in a subsequent subframe 395 after CCA 392. The base station in such examples, may monitor both the PUCCH and PUSCH resources, and determine successful receipt of the uplink grant 380, downlink grant 375, downlink transmissions, or any combination thereof.

Figure 4:
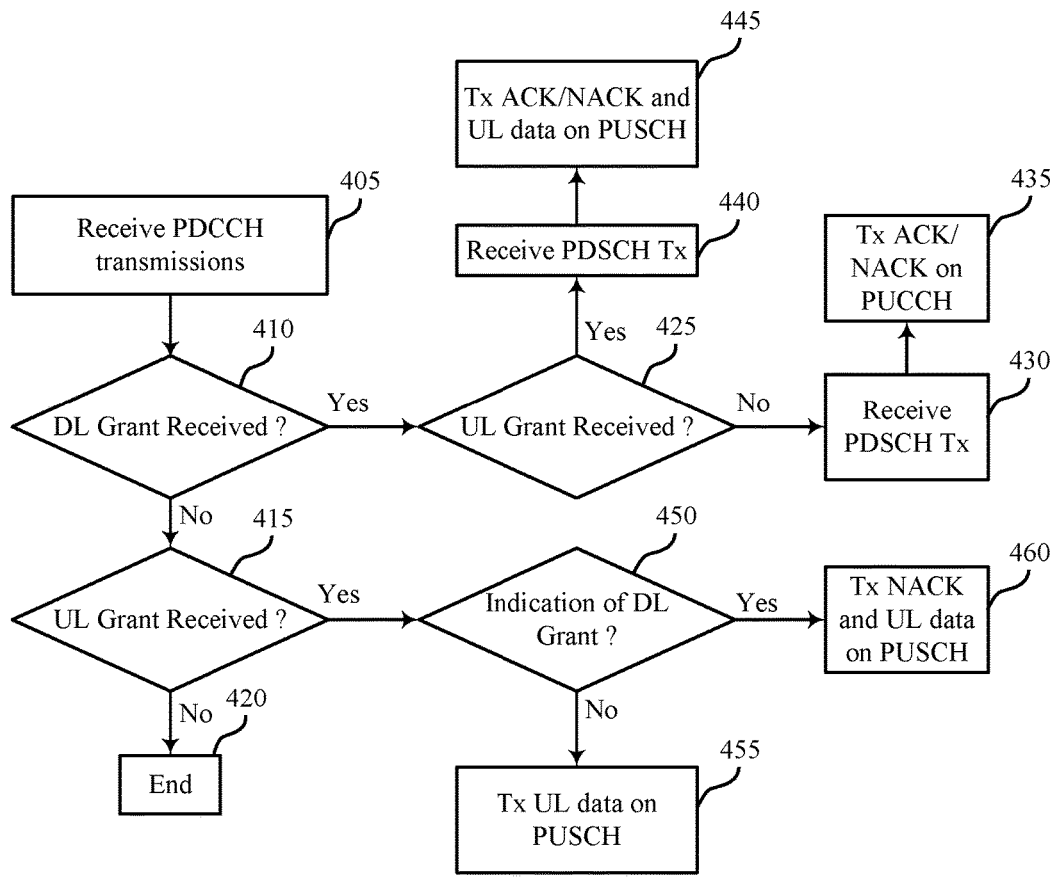
FIG. 4 illustrates an example of a method for acknowledgment of transmissions by a UE in accordance with aspects of the present disclosure.

FIG. 4 shows a flowchart illustrating a method 400 for acknowledgment of transmissions in accordance with various aspects of the present disclosure. The operations of method 400 may be implemented by a device such as a UE 115 or its components as described with reference to FIGS. 1 and 2. For example, the operations of method 400 may be performed by a UE acknowledgement manager as described herein with reference to FIGS. 11 through 13. In some examples, the UE 115 may execute a set of codes to control the functional elements of the device to perform the functions described below. Additionally or alternatively, the UE 115 may perform aspects the functions described below using special-purpose hardware.

At block 405, the UE may receive PDCCH transmissions. The PDCCH transmissions may be received, for example, in a downlink burst in an eCC deployment. At block 410, the UE may determine if a downlink grant is received in the PDCCH transmissions. If a downlink grant is not received, the UE may determine, at block 415, if a uplink grant is received in the PDCCH transmissions. If neither an uplink grant nor a downlink grant is received, the UE may end the process as indicated at block 420, and begin method 400 again in a subsequent downlink burst.

If, at block 410, a downlink grant is received, the UE may determine if an uplink grant is also received, as indicated at block 425. If an uplink grant is not received, the UE may determine that only the downlink grant applies to the UE, and may receive PDSCH transmissions as indicated at block 430. The UE may determine ACK/NACK feedback and, at block 435, the UE may transmit the ACK/NACK feedback using PUCCH resources in an uplink burst.

If, at block 425, the UE determines that an uplink grant is received at block 425, the UE may, at block 440, receive PDSCH transmissions associated with the downlink grant. The UE may determine ACK/NACK feedback and, at block 445, the UE may transmit the ACK/NACK feedback and uplink data using PUSCH resources in an uplink burst. In some examples, the uplink data transmitted using the PUSCH resources may be rate matched around the ACK/NACK feedback.

If, at block 415, it is determined that a downlink grant is not received and that the uplink grant is received, it is determined at block 450 if the uplink grant includes an indication of a downlink grant in the same downlink burst. If the indication of the downlink grant is not present in the uplink grant, the UE may transmit uplink data using PUSCH resources as indicated at block 455. If, at block 450, it is determined that the uplink grant does include an indication of a downlink grant, the UE may transmit a NACK using ACK/NACK resources and transmit the uplink data on PUSCH resources that are rate matched around the ACK/NACK resources, as indicated at block 460.

Figure 5:
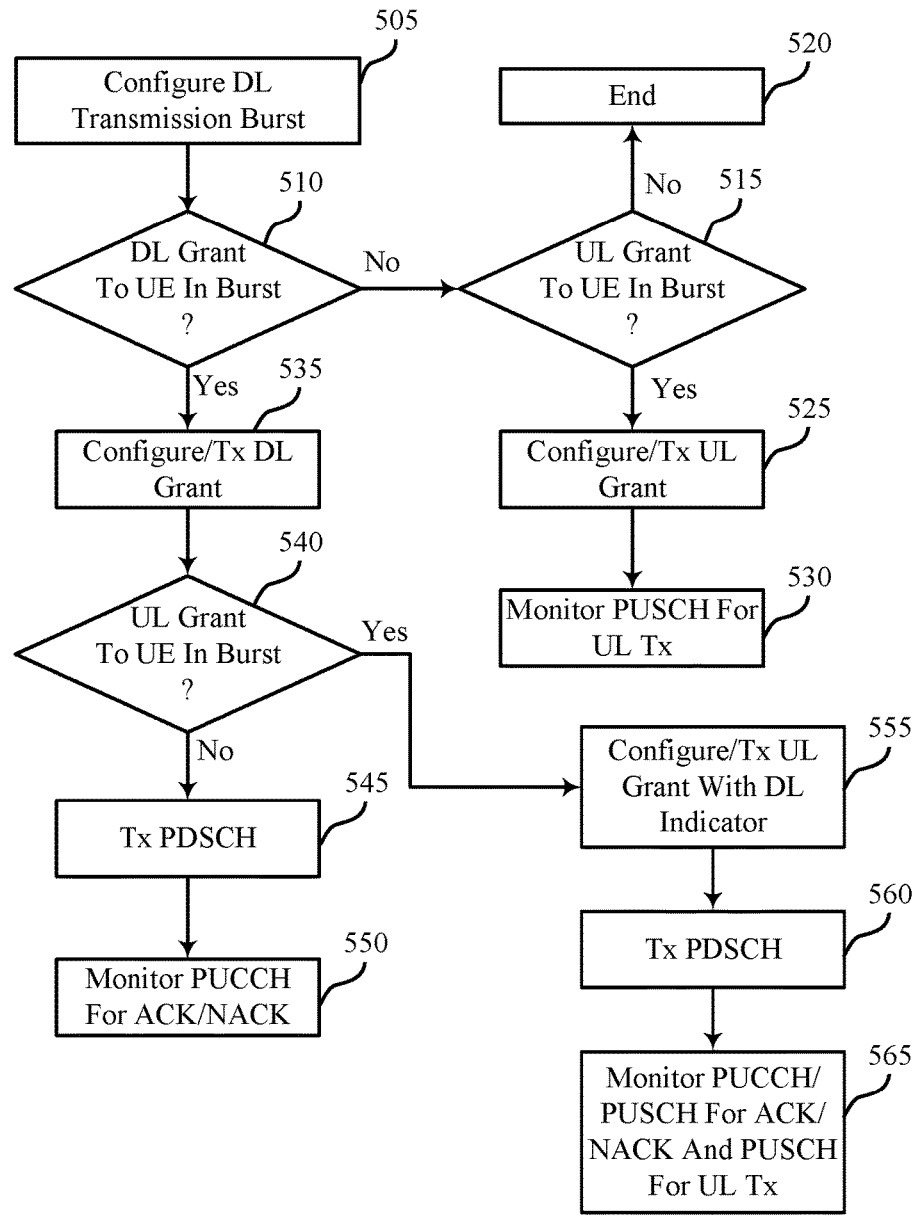
FIG. 5 illustrates an example of a method for acknowledgment of transmissions by a base station in accordance with aspects of the present disclosure.

FIG. 5 shows a flowchart illustrating a method 500 for acknowledgment of transmissions in accordance with various aspects of the present disclosure. The operations of method 500 may be implemented by a device such as a base station 105 or its components as described with reference to FIGS. 1 and 2. For example, the operations of method 500 may be performed by a base station acknowledgement manager as described herein with reference to FIGS. 7 through 9. In some examples, the base station 105 may execute a set of codes to control the functional elements of the device to perform the functions described below. Additionally or alternatively, the base station 105 may perform aspects the functions described below using special-purpose hardware.

At block 505, the base station may configure a downlink transmission burst. At block 510, the base station may determine whether a downlink grant is to be provided to a UE in the downlink burst. If a downlink grant is not to be provided to the UE, the base station may determine, at block 515, whether an uplink grant is to be provided to the UE in the downlink burst. If an uplink grant is not to be provided, the process may end at block 520, and initiated again for another UE or for the same UE in a subsequent downlink burst. If it is determined at block 515 that an uplink grant is to be provided to the UE, the base station, at block 525, may configure and transmit the uplink grant. The base station may then, at block 530, monitor PUSCH resources for uplink transmissions from the UE.

If, at block 510, it is determined that a downlink grant is to be provided to the UE, the base station may, at block 540, determine whether an uplink grant is to be provided to the UE in the downlink burst. If an uplink grant is not to be provided, the base station, at block 545, may transmit downlink transmissions to the UE using PDSCH resources. At block 550, the base station may monitor PUCCH resources for ACK/NACK feedback from the UE.

If, at block 540, it is determined that an uplink grant is to be provided to the UE, the base station may, at block 555, configure and transmit an uplink grant to the UE that contains a downlink grant indicator. The base station, at block 560, may transmit downlink transmissions to the UE using PDSCH resources. At block 565, the base station may monitor PUCCH and PUSCH resources for ACK/NACK feedback and for PUSCH uplink transmissions.

Figure 6:
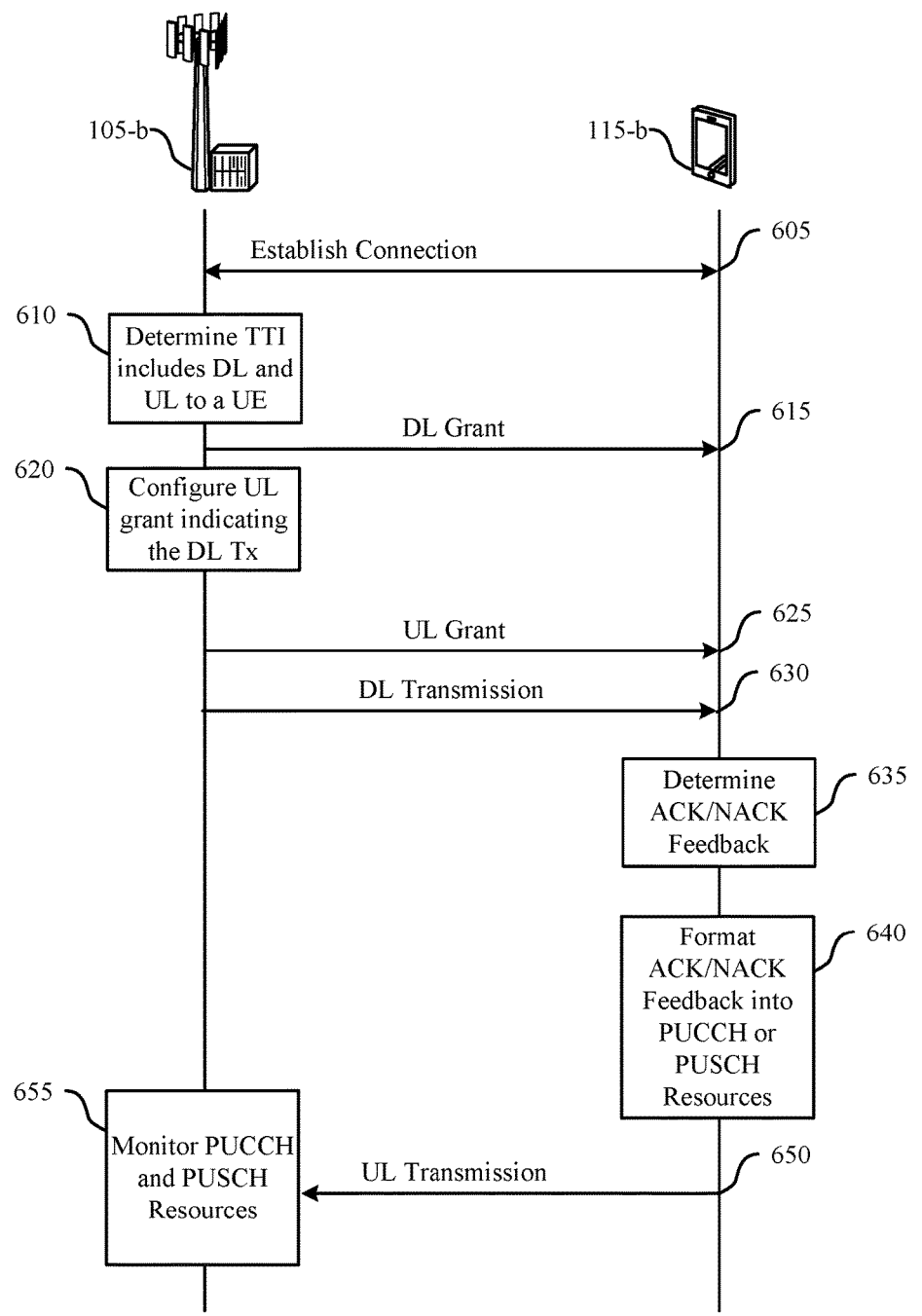
FIG. 6 illustrates an example of a process flow in a system that supports acknowledgment of transmissions in accordance with aspects of the present disclosure.

FIG. 6 illustrates an example of a process flow 600 for acknowledgment of transmissions in accordance with various aspects of the present disclosure. Process flow 600 may include base station 105-b and UE 115-b, which may be examples of the corresponding devices described with reference to FIG. 1-2. Initially, the base station 105-b and UE 115-b may establish communications 605, according to established connection establishment techniques.

At block 610, the base station 105-a may determine that a TTI includes a downlink grant and an uplink grant to the UE 115-b. The base station 105-b may transmit downlink grant 615 to the UE 115-b. At block 620, the base station 105-b may configure an uplink grant indicating the downlink grant 615 is included in the same TTI as the uplink grant. The base station 105-b may transmit the uplink grant 625 to the UE 115-b. The base station 105-b also may transmit downlink transmissions 630, such as PDSCH transmissions, to the UE 115-b.

The UE 115-b, at block 635, may determine ACK/NACK feedback for the downlink grant, uplink grant, downlink transmissions, or any combination thereof. At block 640, the UE 115-b may format the ACK/NACK feedback into PUCCH or PUSCH resources. The resource used for the ACK/NACK feedback may be determined in a similar manner as discussed above with respect to FIGS. 2 through 5. The UE 115-b may transmit uplink transmissions 650, which may include the ACK/NACK feedback in identified uplink resources. The base station 105-b at block 655 may monitor PUCCH and PUSCH resources for the ACK/NACK feedback and uplink shared channel transmissions.

Figure 7:
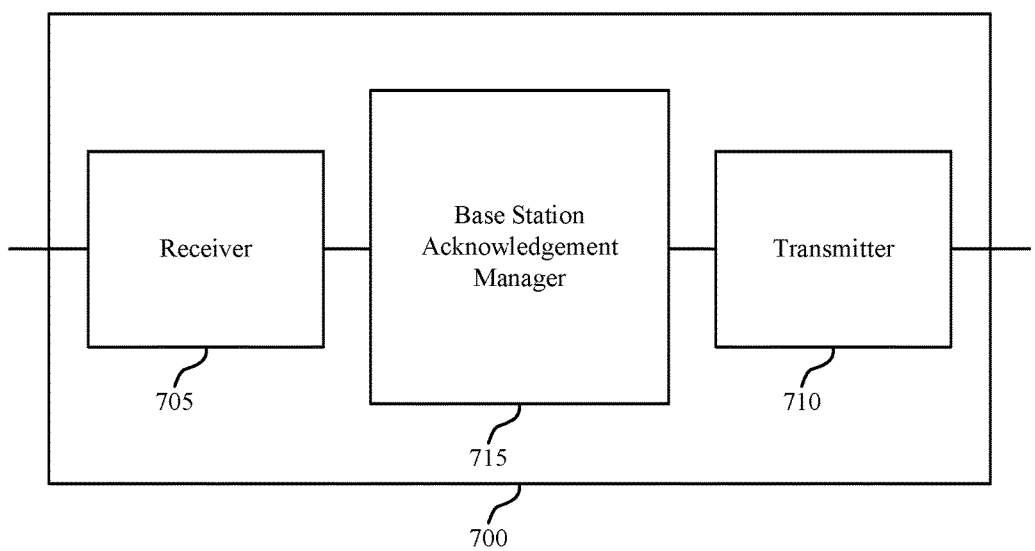
FIGS. 7 through 9 show block diagrams of a wireless device that supports acknowledgment of transmissions in accordance with aspects of the present disclosure.

FIG. 7 shows a block diagram of a wireless device 700 that supports acknowledgment of transmissions in accordance with various aspects of the present disclosure. Wireless device 700 may be an example of aspects of a base station 105 described with reference to FIGS. 1 and 2. Wireless device 700 may include receiver 705, transmitter 710 and base station acknowledgement manager 715. Wireless device 700 may also include a processor. Each of these components may be in communication with each other.

The receiver 705 may receive information such as packets, user data, or control information associated with various information channels (e.g., control channels, data channels, and information related to acknowledgment of transmissions, etc.). Information may be passed on to other components of the device. The receiver 705 may be an example of aspects of the transceiver 1025 described with reference to FIG. 10.

The transmitter 710 may transmit signals received from other components of wireless device 700. In some examples, the transmitter 710 may be collocated with a receiver in a transceiver module. For example, the transmitter 710 may be an example of aspects of the transceiver 1025 described with reference to FIG. 10. The transmitter 710 may include a single antenna, or it may include a plurality of antennas.

The base station acknowledgement manager 715 may determine that a TTI includes downlink resources for a downlink transmission to a UE and uplink resources for an uplink shared channel transmission from the UE, and transmit an uplink grant to the UE indicating the uplink resources and indicating that the TTI includes the downlink transmission to the UE. The base station acknowledgement manager 715 may also be an example of aspects of the base station acknowledgement manager 1005 described with reference to FIG. 10.

Figure 8:
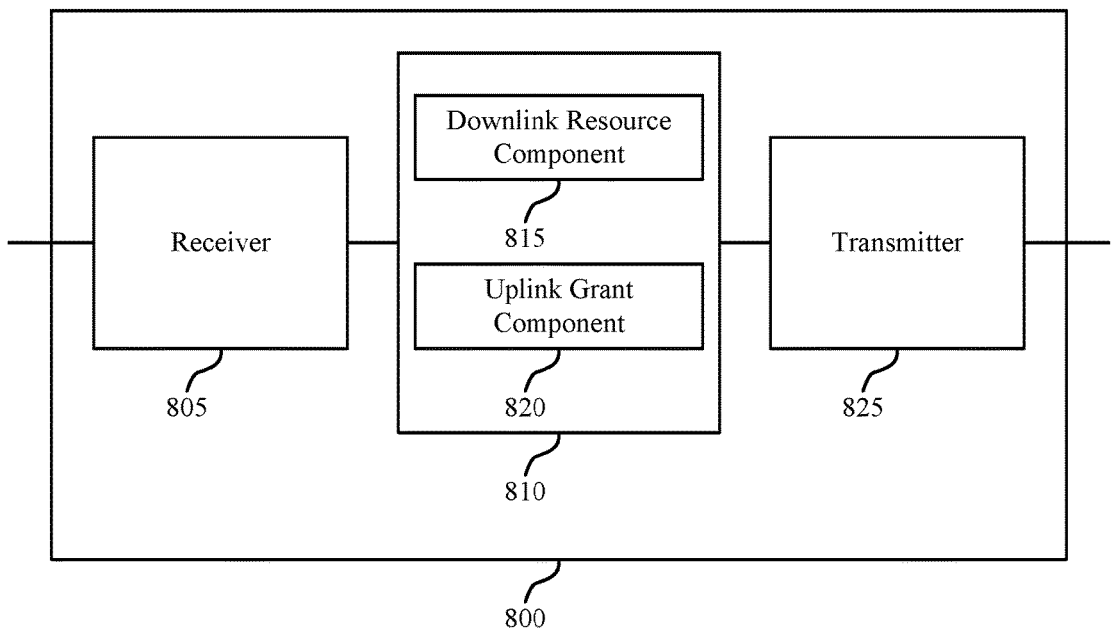

FIG. 8 shows a block diagram of a wireless device 800 that supports acknowledgment of transmissions in accordance with various aspects of the present disclosure. Wireless device 800 may be an example of aspects of a wireless device 700 or a base station 105 described with reference to FIGS. 1, 2 and 7. Wireless device 800 may include receiver 805, base station acknowledgement manager 810 and transmitter 825. Wireless device 800 may also include a processor. Each of these components may be in communication with each other.

The receiver 805 may receive information which may be passed on to other components of the device. The receiver 805 may also perform the functions described with reference to the receiver 705 of FIG. 7. The receiver 805 may be an example of aspects of the transceiver 1025 described with reference to FIG. 10.

The base station acknowledgement manager 810 may be an example of aspects of base station acknowledgement manager 715 described with reference to FIG. 7. The base station acknowledgement manager 810 may include downlink resource component 815 and uplink grant component 820. The base station acknowledgement manager 810 may be an example of aspects of the base station acknowledgement manager 1005 described with reference to FIG. 10.

The downlink resource component 815 may determine that a TTI includes downlink resources for a downlink transmission to a UE and uplink resources for an uplink shared channel transmission from the UE. The uplink grant component 820 may transmit an uplink grant to the UE indicating the uplink resources and indicating that the TTI includes the downlink transmission to the UE.

The transmitter 825 may transmit signals received from other components of wireless device 800. In some examples, the transmitter 825 may be collocated with a receiver in a transceiver module. For example, the transmitter 825 may be an example of aspects of the transceiver 1025 described with reference to FIG. 10. The transmitter 825 may utilize a single antenna, or it may utilize a plurality of antennas.

Figure 9:
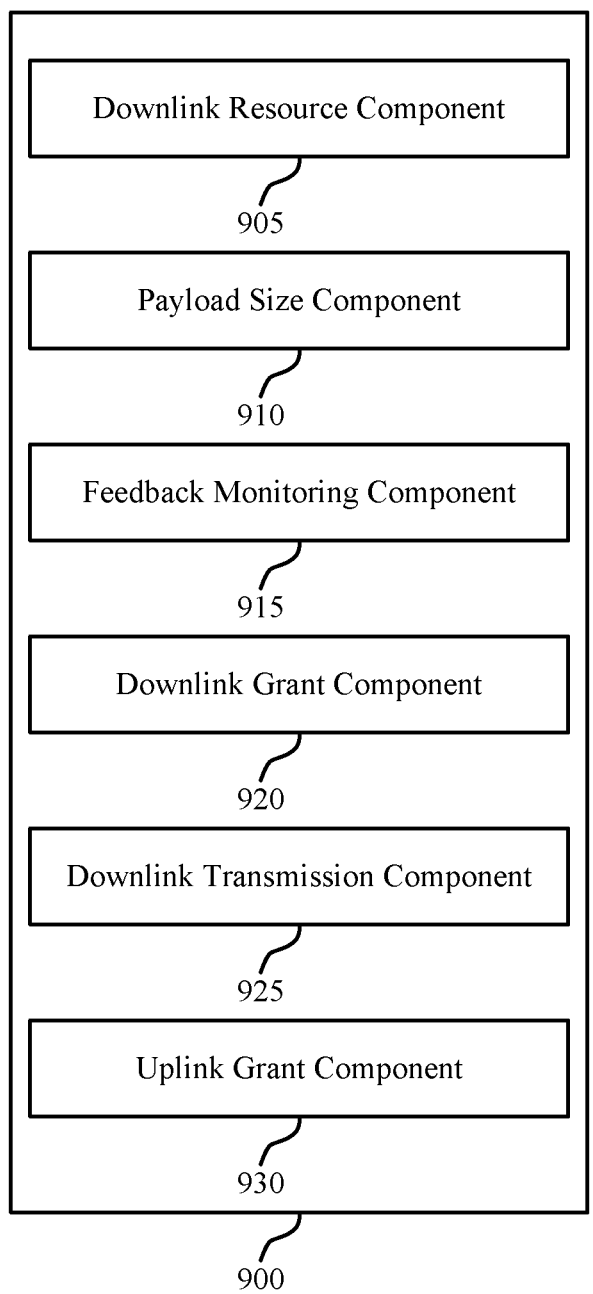

FIG. 9 shows a block diagram of a base station acknowledgement manager 900 which may be an example of the corresponding component of wireless device 700 or wireless device 800. That is, base station acknowledgement manager 900 may be an example of aspects of base station acknowledgement manager 715 or base station acknowledgement manager 810 described with reference to FIGS. 7 and 8. The base station acknowledgement manager 900 may also be an example of aspects of the base station acknowledgement manager 1005 described with reference to FIG. 10.

The base station acknowledgement manager 900 may include downlink resource component 905, payload size component 910, feedback monitoring component 915, downlink grant component 920, downlink transmission component 925 and uplink grant component 930. Each of these modules may communicate, directly or indirectly, with one another (e.g., via one or more buses).

The downlink resource component 905 may determine that a TTI includes downlink resources for a downlink transmission to a UE and uplink resources for an uplink shared channel transmission from the UE. The payload size component 910 may configure the UE with a fixed payload size for acknowledgment feedback transmitted using the uplink shared channel resource.

The feedback monitoring component 915 may monitor an uplink shared channel resource for acknowledgment receipt feedback (e.g., HARQ ACK/NACK feedback) indicating successful receipt of the uplink grant and one or more of the downlink grant or at least a portion of the downlink transmission, or successful receipt of the uplink grant and unsuccessful receipt of the downlink grant. The feedback monitoring component 915 may monitor an uplink shared channel resource subsequent to the uplink control channel resource for acknowledgment receipt feedback indicating successful receipt of at least a portion of the downlink transmission, and monitor for acknowledgment receipt feedback indicating successful receipt of one or more of the downlink grant, the uplink grant, or the downlink transmission.

In some cases, monitoring for the acknowledgment receipt feedback includes monitoring an uplink control channel resource for acknowledgment receipt feedback indicating successful receipt of the downlink grant and unsuccessful receipt of the uplink grant. In some cases, monitoring for the acknowledgment receipt feedback includes monitoring an uplink control channel resource of an uplink TTI for acknowledgment receipt feedback indicating successful receipt of one or more of the downlink grant or the uplink grant.

The downlink grant component 920 may transmit a downlink grant to the UE indicating the downlink resources, and may also may transmit the downlink transmission (e.g., PDSCH transmission) to the UE. The uplink grant component 930 may transmit an uplink grant to the UE indicating the uplink resources and indicating that the TTI includes the downlink transmission to the UE.

Figure 10:
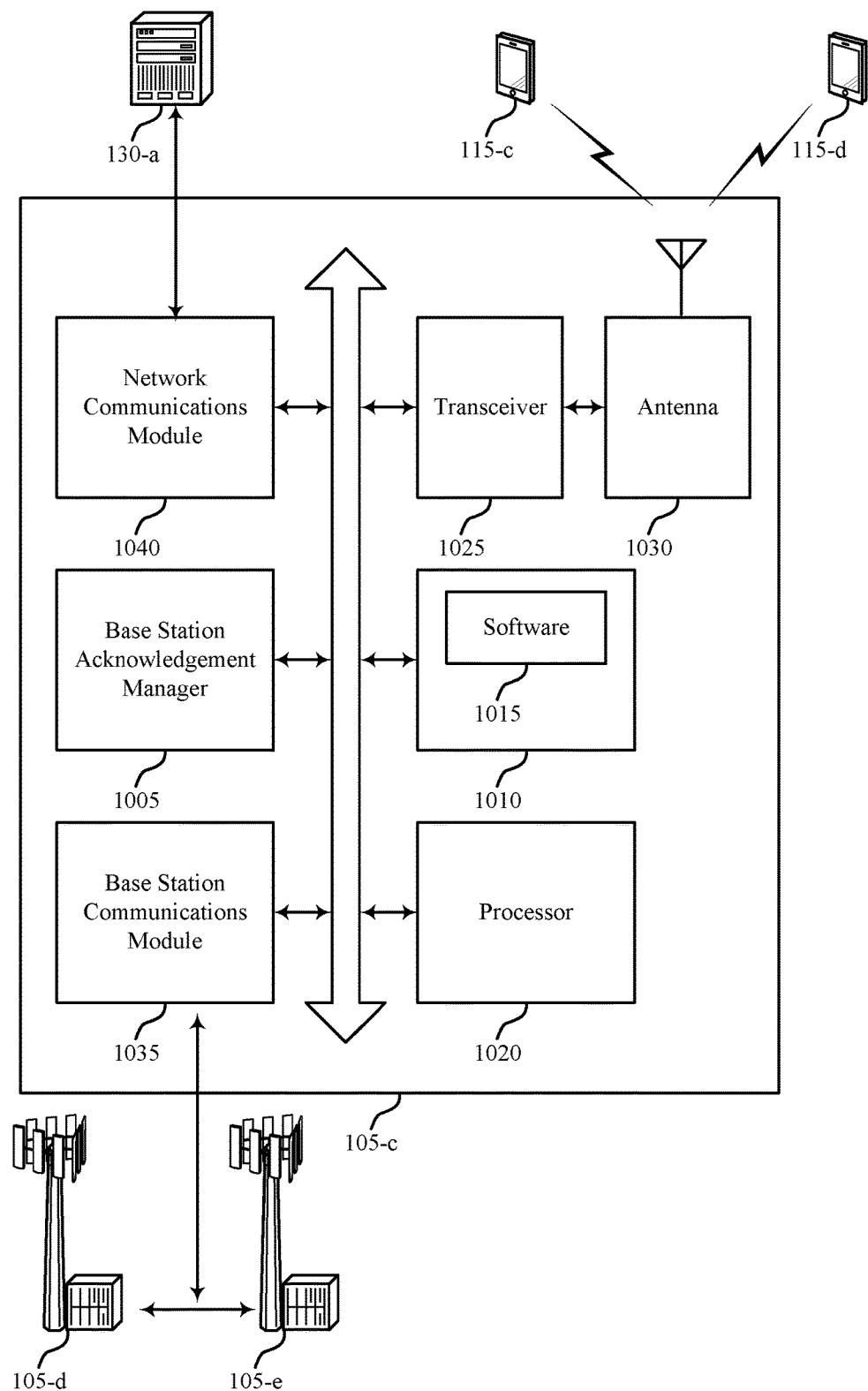
FIG. 10 illustrates a block diagram of a system including a base station that supports acknowledgment of transmissions in accordance with aspects of the present disclosure.

FIG. 10 shows a diagram of a wireless system 1000 including a device configured that supports acknowledgment of transmissions in accordance with various aspects of the present disclosure. For example, system 1000 may include base station 105-*c*, which may be an example of a wireless device 700, a wireless device 800, or a base station 105 as described with reference to FIGS. 1, 2 and 7 through 9. Base station 105-*c* may also include components for bi-directional voice and data communications including components for transmitting communications and components for receiving communications. For example, base station 105-*c* may communicate bi-directionally with one or more UEs 115.

Base station 105-*c* may also include base station acknowledgement manager 1005, memory 1010, processor 1020, transceiver 1025, antenna 1030, base station communications module 1035 and network communications module 1040. Each of these modules may communicate, directly or indirectly, with one another (e.g., via one or more buses).

The base station acknowledgement manager 1005 may be an example of a base station acknowledgement manager as described with reference to FIGS. 7 through 9.

The memory 1010 may include random access memory (RAM) and read only memory (ROM). The memory 1010 may store computer-readable, computer-executable software including instructions that, when executed, cause the processor to perform various functions described herein (e.g., acknowledgment of transmissions, etc.). In some cases, the software 1015 may not be directly executable by the processor but may cause a computer (e.g., when compiled and executed) to perform functions described herein. The processor 1020 may include an intelligent hardware device, (e.g., a central processing unit (CPU), a microcontroller, an application specific integrated circuit (ASIC), etc.)

The transceiver 1025 may communicate bi-directionally, via one or more antennas, wired, or wireless links, with one or more networks, as described above. For example, the transceiver 1025 may communicate bi-directionally with a base station 105 or a UE 115. The transceiver 1025 may also include a modem to modulate the packets and provide the modulated packets to the antennas for transmission, and to demodulate packets received from the antennas. In some cases, the wireless device may include a single antenna 1030. However, in some cases the device may have more than one antenna 1030, which may be capable of concurrently transmitting or receiving multiple wireless transmissions.

The base station communications module 1035 may manage communications with other base station 105, and may include a controller or scheduler for controlling communications with UEs 115 in cooperation with other base stations 105. For example, the base station communications module 1035 may coordinate scheduling for transmissions to UEs 115 for various interference mitigation techniques such as beamforming or joint transmission. In some examples, base station communications module 1035 may provide an X2 interface within an LTE/LTE-A wireless communication network technology to provide communication between base stations 105.

The network communications module 1040 may manage communications with the core network (e.g., via one or more wired backhaul links). For example, the network communications module 1040 may manage the transfer of data communications for client devices, such as one or more UEs 115.

Figure 11:
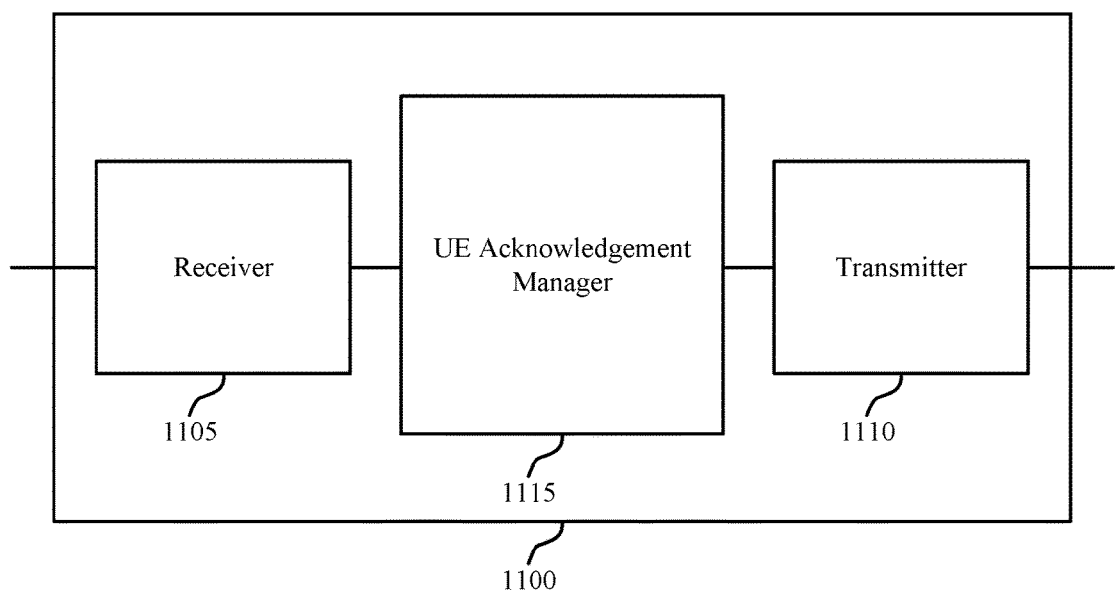
FIGS. 11 through 13 show block diagrams of a wireless device that supports acknowledgment of transmissions in accordance with aspects of the present disclosure.

FIG. 11 shows a block diagram of a wireless device 1100 that supports acknowledgment of transmissions in accordance with various aspects of the present disclosure. Wireless device 1100 may be an example of aspects of a UE 115 described with reference to FIGS. 1 and 2. Wireless device 1100 may include receiver 1105, transmitter 1110 and UE acknowledgement manager 1115. Wireless device 1100 may also include a processor. Each of these components may be in communication with each other.

The receiver 1105 may receive information such as packets, user data, or control information associated with various information channels (e.g., control channels, data channels, and information related to acknowledgment of transmissions, etc.). Information may be passed on to other components of the device. The receiver 1105 may be an example of aspects of the transceiver 1425 described with reference to FIG. 14.

The transmitter 1110 may transmit signals received from other components of wireless device 1100. In some examples, the transmitter 1110 may be collocated with a receiver in a transceiver module. For example, the transmitter 1110 may be an example of aspects of the transceiver 1425 described with reference to FIG. 14. The transmitter 1110 may include a single antenna, or it may include a plurality of antennas.

The UE acknowledgement manager 1115 may receive an uplink grant that indicates uplink resources for an uplink shared channel transmission and a presence of a downlink grant in a same TTI as the uplink shared channel transmission, and determine acknowledgment feedback for one or more of the downlink grant or a downlink transmission based on the uplink grant. The UE acknowledgement manager 1115 may also be an example of aspects of the UE acknowledgement manager 1405 described with reference to FIG. 14.

Figure 12:
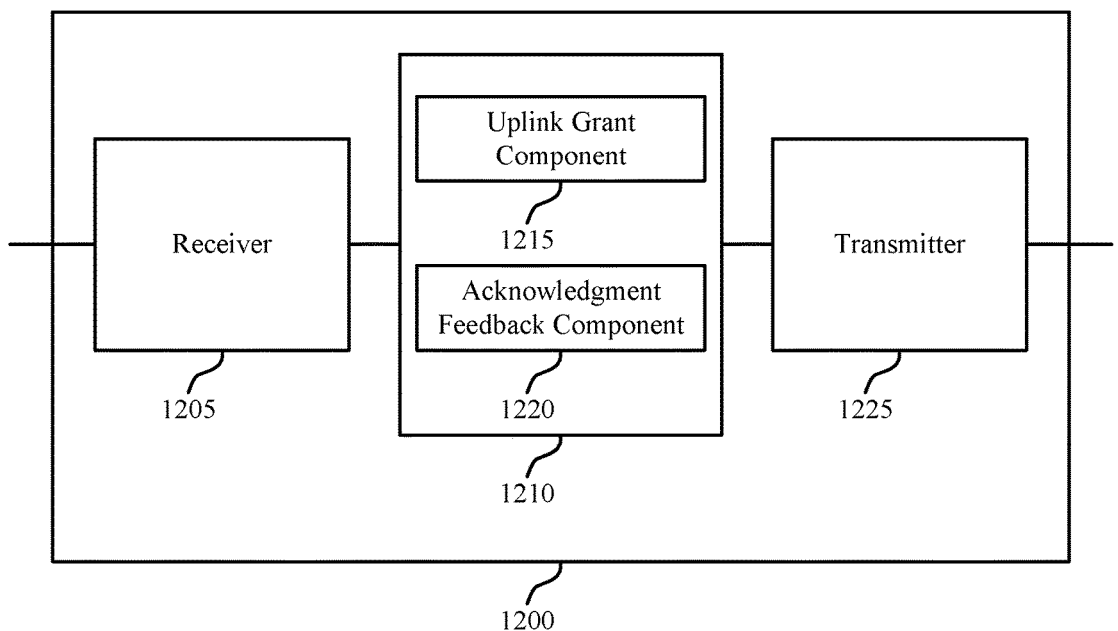

FIG. 12 shows a block diagram of a wireless device 1200 that supports acknowledgment of transmissions in accordance with various aspects of the present disclosure. Wireless device 1200 may be an example of aspects of a wireless device 1100 or a UE 115 described with reference to FIGS. 1, 2 and 11. Wireless device 1200 may include receiver 1205, UE acknowledgement manager 1210 and transmitter 1225. Wireless device 1200 may also include a processor. Each of these components may be in communication with each other.

The receiver 1205 may receive information which may be passed on to other components of the device. The receiver 1205 may also perform the functions described with reference to the receiver 1105 of FIG. 11. The receiver 1205 may be an example of aspects of the transceiver 1425 described with reference to FIG. 14.

The UE acknowledgement manager 1210 may be an example of aspects of UE acknowledgement manager 1115 described with reference to FIG. 11. The UE acknowledgement manager 1210 may include uplink grant component 1215 and acknowledgment feedback component 1220. The UE acknowledgement manager 1210 may be an example of aspects of the UE acknowledgement manager 1405 described with reference to FIG. 14.

The uplink grant component 1215 may receive an uplink grant that indicates uplink resources for an uplink shared channel transmission and a presence of a downlink grant in a same TTI as the uplink shared channel transmission.

The acknowledgment feedback component 1220 may determine acknowledgment feedback for one or more of the downlink grant or a downlink transmission based on the uplink grant, and transmit the acknowledgment feedback. The acknowledgment feedback component 1220 may also, in some examples, generate a NACK that indicates the downlink grant was not successfully received based on an indicator of a downlink grant received in the uplink grant. The acknowledgment feedback component 1220 may also, in some examples, transmit ACK/NACK feedback using a first subset of uplink resources with uplink transmissions rate matched around the first subset of uplink resources. The acknowledgment feedback component 1220 may also, in some examples, determine that the downlink grant was not successfully received, and transmit a negative acknowledgment of the receipt of the downlink grant in the control channel resources.

In some cases, determining the acknowledgment feedback includes determining that at least a first portion of the information in the downlink transmissions is successfully received and decoded. In some cases, determining the acknowledgment feedback further includes determining that at least a second portion of the information in the downlink transmissions is not successfully received and decoded. In some cases, determining the acknowledgment feedback includes identifying a first subset of the uplink resources for the acknowledgment feedback.

The transmitter 1225 may transmit signals received from other components of wireless device 1200. In some examples, the transmitter 1225 may be collocated with a receiver in a transceiver module. For example, the transmitter 1225 may be an example of aspects of the transceiver 1425 described with reference to FIG. 14. The transmitter 1225 may utilize a single antenna, or it may utilize a plurality of antennas.

Figure 13:
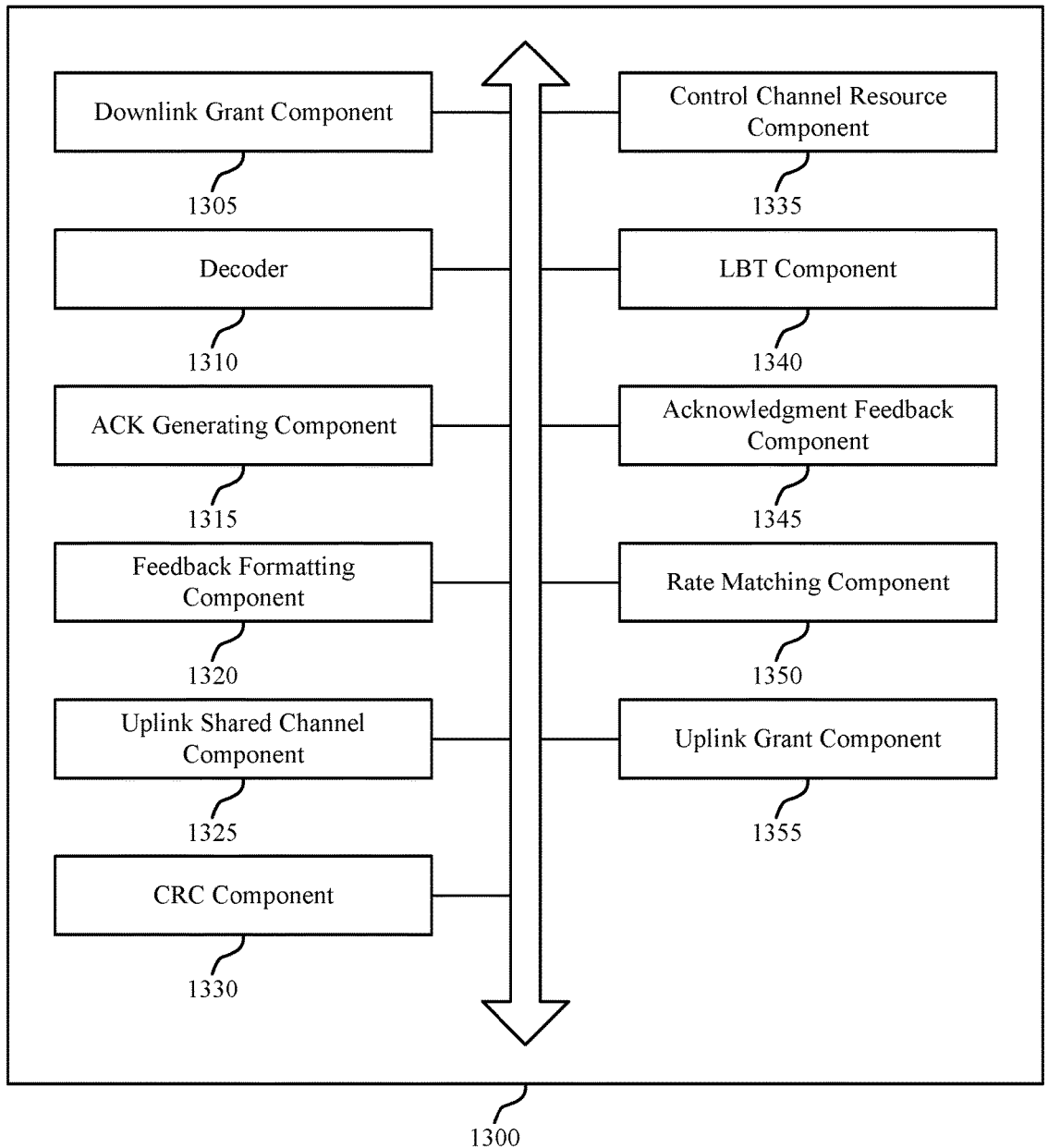

FIG. 13 shows a block diagram of a UE acknowledgement manager 1300 which may be an example of the corresponding component of wireless device 1100 or wireless device 1200. That is, UE acknowledgement manager 1300 may be an example of aspects of UE acknowledgement manager 1115 or UE acknowledgement manager 1210 described with reference to FIGS. 11 and 12. The UE acknowledgement manager 1300 may also be an example of aspects of the UE acknowledgement manager 1405 described with reference to FIG. 14.

The UE acknowledgement manager 1300 may include downlink grant component 1305, decoder 1310, ACK generating component 1315, feedback formatting component 1320, uplink shared channel component 1325, CRC component 1330, control channel resource component 1335, LBT component 1340, acknowledgment feedback component 1345, rate matching component 1350 and uplink grant component 1355. Each of these modules may communicate, directly or indirectly, with one another (e.g., via one or more buses).

The downlink grant component 1305 may receive the downlink grant, where the downlink grant indicates resources for downlink transmissions in the same TTI as the uplink shared channel transmission. The decoder 1310 may attempt to receive and decode information in the downlink transmissions. The ACK generating component 1315 may generate an ACK that indicates the first portion of the information in the downlink transmissions was successfully received. The feedback formatting component 1320 may format the ACK and NACK into ACK/NACK feedback associated with the downlink transmissions.

The uplink shared channel component 1325 may transmit the uplink shared channel transmission using the uplink resources indicated in the uplink grant. The CRC component 1330 may generate and include CRC information with the ACK/NACK feedback. The control channel resource component 1335 may identify control channel resources for acknowledging receipt of the downlink grant and the downlink transmission in a first subframe. The LBT component 1340 may perform a listen-before-talk (LBT) procedure, such as a CCA.

The acknowledgment feedback component 1345 may determine acknowledgment feedback for one or more of the downlink grant or a downlink transmission based on the uplink grant, transmit the acknowledgment feedback, generate a NACK that indicates the downlink grant was not successfully received, transmit ACK/NACK feedback using a first subset of the uplink resources, determine that the downlink grant was not successfully received, and transmit a negative acknowledgment of the receipt of the downlink grant in the control channel resources.

The rate matching component 1350 may rate match the uplink shared channel transmission around the acknowledgment feedback, transmit the uplink shared channel transmission using a second subset of the uplink resources that are rate matched around the first subset of the uplink resources, and identify a second subset of the uplink resources that are rate matched around the first subset of the uplink resources. In some cases, the first subset of the uplink resources are identified irrespective of an amount of data in the acknowledgment feedback.

The uplink grant component 1355 may receive an uplink grant that indicates uplink resources for an uplink shared channel transmission and a presence of a downlink grant in a same TTI as the uplink shared channel transmission.

Figure 14:
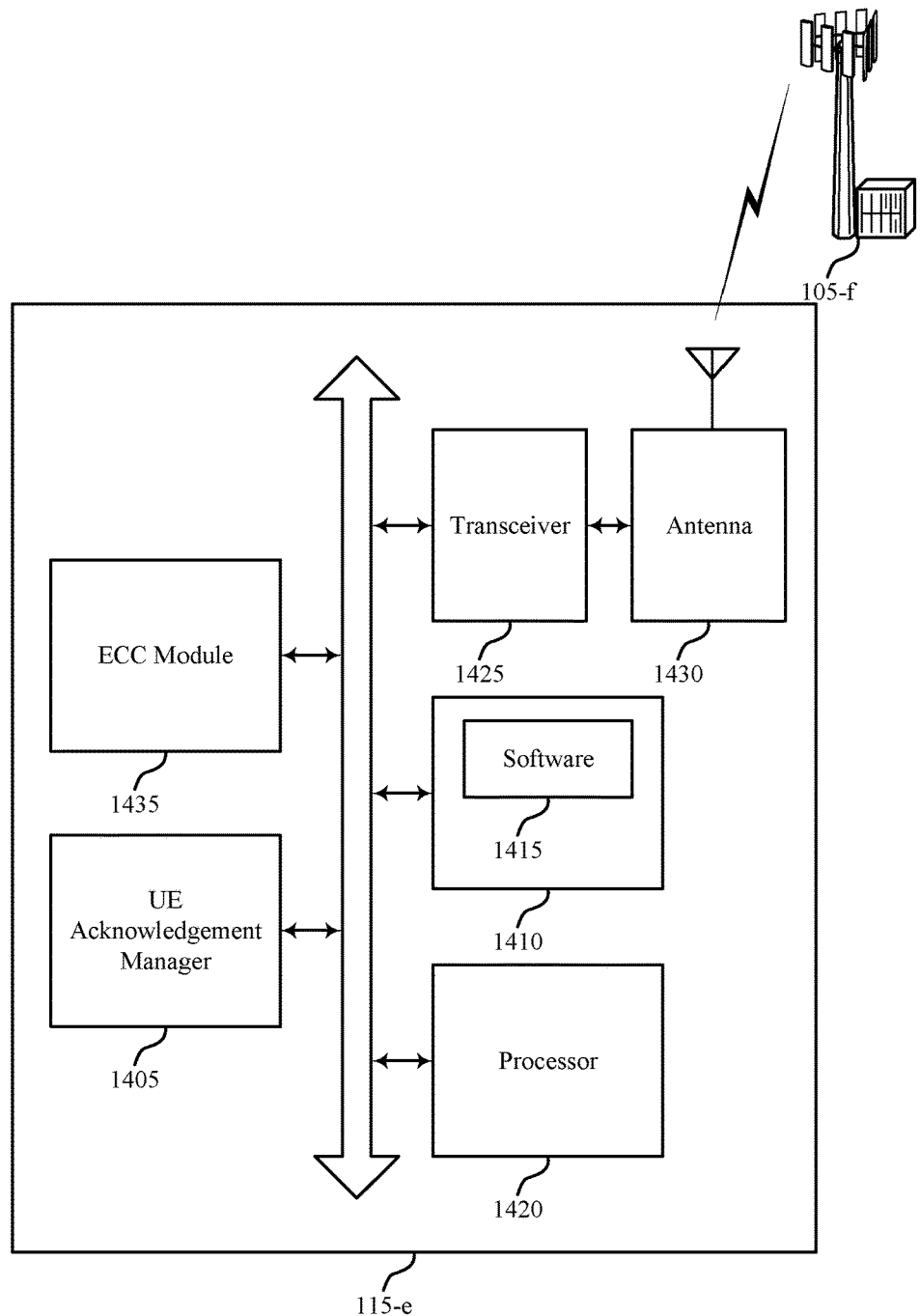
FIG. 14 illustrates a block diagram of a system including a UE that supports acknowledgment of transmissions in accordance with aspects of the present disclosure.

FIG. 14 shows a diagram of a system 1400 including a device that supports acknowledgment of transmissions in accordance with various aspects of the present disclosure. For example, system 1400 may include UE 115-e, which may be an example of a wireless device 1100, a wireless device 1200, or a UE 115 as described with reference to FIGS. 1, 2 and 11 through 13.

UE 115-e may also include UE acknowledgement manager 1405, memory 1410, processor 1420, transceiver 1425, antenna 1430 and ECC module 1435. Each of these modules may communicate, directly or indirectly, with one another (e.g., via one or more buses). The UE acknowledgement manager 1405 may be an example of a UE acknowledgement manager as described with reference to FIGS. 11 through 13.

The memory 1410 may include RAM and ROM. The memory 1410 may store computer-readable, computer-executable software including instructions that, when executed, cause the processor to perform various functions described herein (e.g., acknowledgment of transmissions, etc.). In some cases, the software 1415 may not be directly executable by the processor but may cause a computer (e.g., when compiled and executed) to perform functions described herein. The processor 1420 may include an intelligent hardware device, (e.g., a CPU, a microcontroller, an ASIC, etc.)

The transceiver 1425 may communicate bi-directionally, via one or more antennas, wired, or wireless links, with one or more networks, as described above. For example, the transceiver 1425 may communicate bi-directionally with a base station 105 or a UE 115. The transceiver 1425 may also include a modem to modulate the packets and provide the modulated packets to the antennas for transmission, and to demodulate packets received from the antennas. In some cases, the wireless device may include a single antenna 1430. However, in some cases the device may have more than one antenna 1030, which may be capable of concurrently transmitting or receiving multiple wireless transmissions.

ECC module 1435 may enable operations using enhanced component carriers (eCCs) such as communication using shared or unlicensed spectrum, using reduced TTIs or subframe durations, or using a large number of component carriers.

Figure 15:
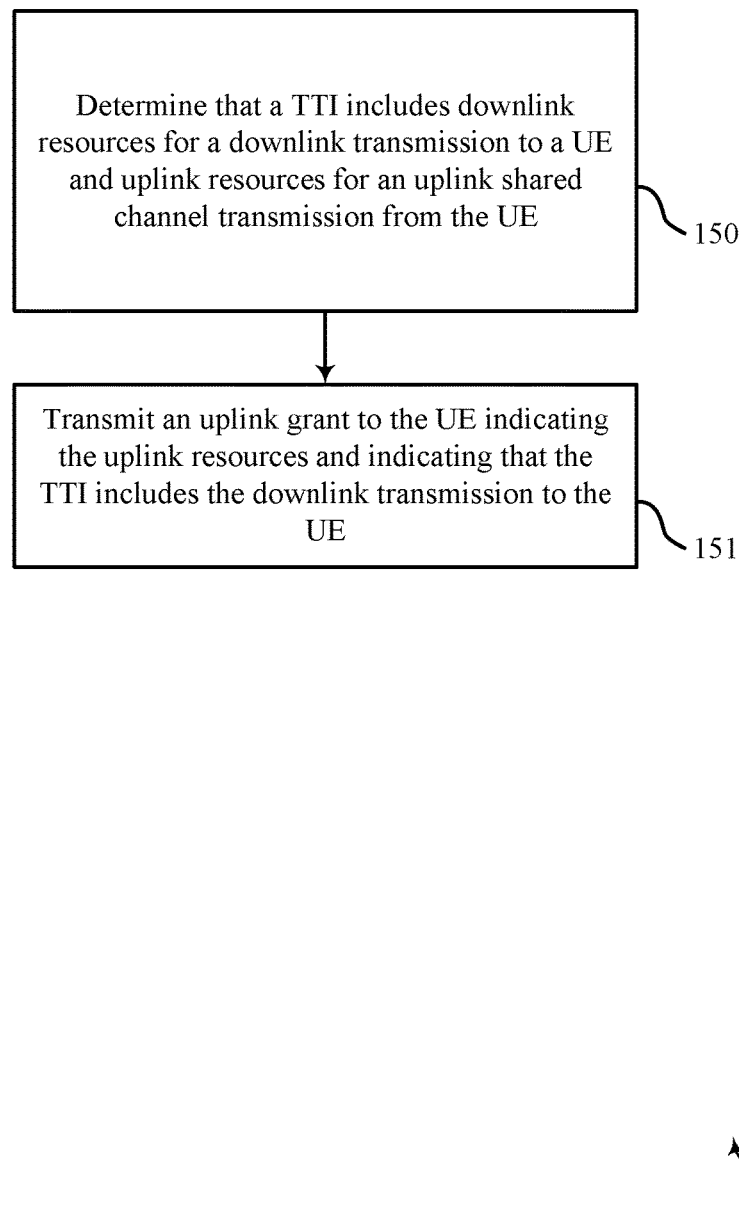
FIGS. 15 through 18 illustrate methods for acknowledgment of transmissions in accordance with aspects of the present disclosure.

FIG. 15 shows a flowchart illustrating a method 1500 for acknowledgment of transmissions in accordance with various aspects of the present disclosure. The operations of method 1500 may be implemented by a device such as a base station 105 or its components as described with reference to FIGS. 1 and 2. For example, the operations of method 1500 may be performed by the base station acknowledgement manager as described herein. In some examples, the base station 105 may execute a set of codes to control the functional elements of the device to perform the functions described below. Additionally or alternatively, the base station 105 may perform aspects the functions described below using special-purpose hardware.

At block 1505, the base station 105 may determine that a TTI includes downlink resources for a downlink transmission to a UE and uplink resources for an uplink shared channel transmission from the UE as described above with reference to FIGS. 2 through 6. In certain examples, the operations of block 1505 may be performed by the downlink resource component as described with reference to FIGS. 8 and 9.

At block 1510, the base station 105 may transmit an uplink grant to the UE indicating the uplink resources and indicating that the TTI includes the downlink transmission to the UE as described above with reference to FIGS. 2 through 6. In certain examples, the operations of block 1510 may be performed by the uplink grant component as described with reference to FIGS. 8 and 9.

Figure 16:
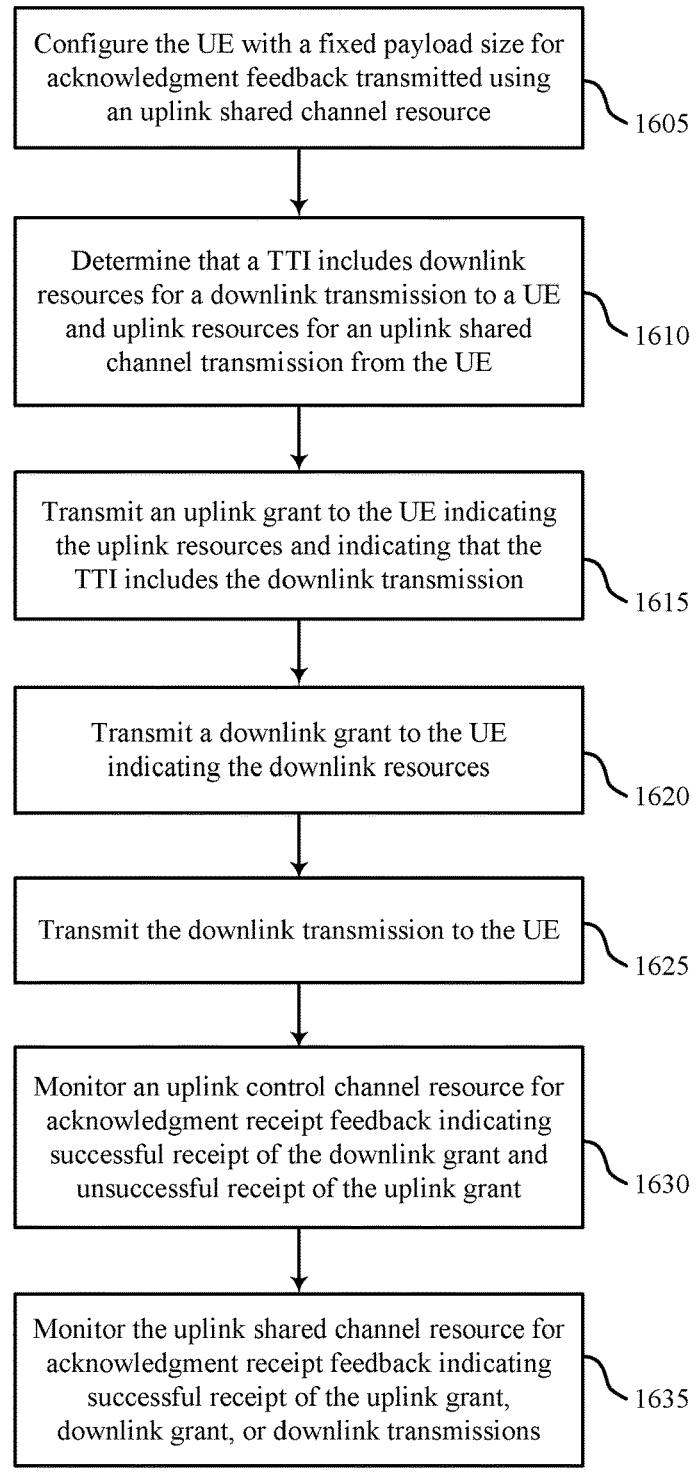

FIG. 16 shows a flowchart illustrating a method 1600 for acknowledgment of transmissions in accordance with various aspects of the present disclosure. The operations of method 1600 may be implemented by a device such as a base station 105 or its components as described with reference to FIGS. 1 and 2. For example, the operations of method 1600 may be performed by the base station acknowledgement manager as described herein. In some examples, the base station 105 may execute a set of codes to control the functional elements of the device to perform the functions described below. Additionally or alternatively, the base station 105 may perform aspects the functions described below using special-purpose hardware.

At block 1605, the base station 105 may configure the UE with a fixed payload size for acknowledgment feedback transmitted using an uplink shared channel resource as described above with reference to FIGS. 2 through 6. In certain examples, the operations of block 1605 may be performed by the payload size component as described with reference to FIGS. 8 and 9.

At block 1610, the base station 105 may determine that a TTI includes downlink resources for a downlink transmission to a UE and uplink resources for an uplink shared channel transmission from the UE as described above with reference to FIGS. 2 through 6. In certain examples, the operations of block 1610 may be performed by the downlink resource component as described with reference to FIGS. 8 and 9.

At block 1615, the base station 105 may transmit an uplink grant to the UE indicating the uplink resources and indicating that the TTI includes the downlink transmission to the UE as described above with reference to FIGS. 2 through 6. In certain examples, the operations of block 1615 may be performed by the uplink grant component as described with reference to FIGS. 8 and 9.

At block 1620, the base station 105 may transmit a downlink grant to the UE indicating the downlink resources as described above with reference to FIGS. 2 through 6. In certain examples, the operations of block 1620 may be performed by the downlink grant component as described with reference to FIGS. 8 and 9.

At block 1625, the base station 105 may transmit the downlink transmission to the UE as described above with reference to FIGS. 2 through 6. In certain examples, the operations of block 1625 may be performed by the downlink transmission component as described with reference to FIGS. 8 and 9.

At block 1630, the base station 105 may monitor for acknowledgment receipt feedback indicating successful receipt of one or more of the downlink grant, the uplink grant, or the downlink transmission as described above with reference to FIGS. 2 through 6. In some cases, monitoring for the acknowledgment receipt feedback includes monitoring an uplink control channel resource for acknowledgment receipt feedback indicating successful receipt of the downlink grant and unsuccessful receipt of the uplink grant. In certain examples, the operations of block 1630 may be performed by the feedback monitoring component as described with reference to FIGS. 8 and 9.

At block 1635, the base station 105 may monitor the uplink shared channel resource for acknowledgment receipt feedback indicating: successful receipt of the uplink grant and one or more of the downlink grant or at least a portion of the downlink transmission, or successful receipt of the uplink grant and unsuccessful receipt of the downlink grant as described above with reference to FIGS. 2 through 6. In certain examples, the operations of block 1635 may be performed by the feedback monitoring component as described with reference to FIGS. 8 and 9.

Figure 17:
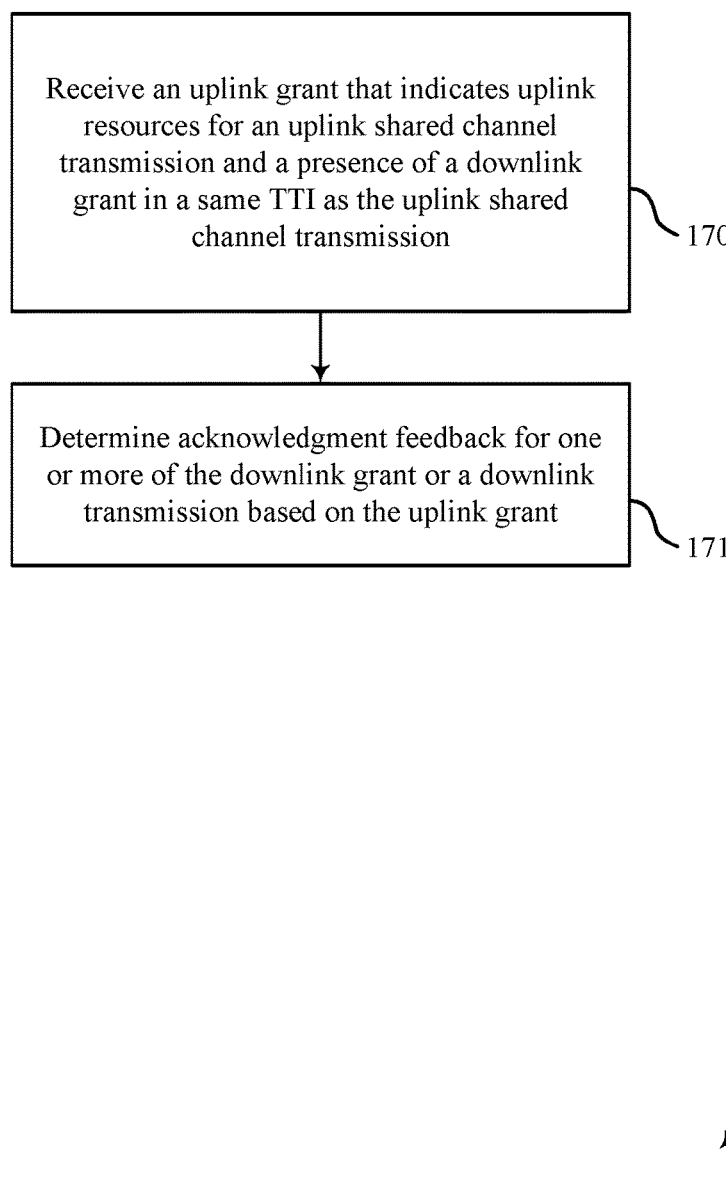

FIG. 17 shows a flowchart illustrating a method 1700 for acknowledgment of transmissions in accordance with various aspects of the present disclosure. The operations of method 1700 may be implemented by a device such as a UE 115 or its components as described with reference to FIGS. 1 and 2. For example, the operations of method 1700 may be performed by the UE acknowledgement manager as described herein. In some examples, the UE 115 may execute a set of codes to control the functional elements of the device to perform the functions described below. Additionally or alternatively, the UE 115 may perform aspects the functions described below using special-purpose hardware.

At block 1705, the UE 115 may receive an uplink grant that indicates uplink resources for an uplink shared channel transmission and a presence of a downlink grant in a same TTI as the uplink shared channel transmission as described above with reference to FIGS. 2 through 6. In certain examples, the operations of block 1705 may be performed by the uplink grant component as described with reference to FIGS. 12 and 13.

At block 1710, the UE 115 may determine acknowledgment feedback for one or more of the downlink grant or a downlink transmission based on the uplink grant as described above with reference to FIGS. 2 through 6. In certain examples, the operations of block 1710 may be performed by the acknowledgment feedback component as described with reference to FIGS. 12 and 13.

Figure 18:
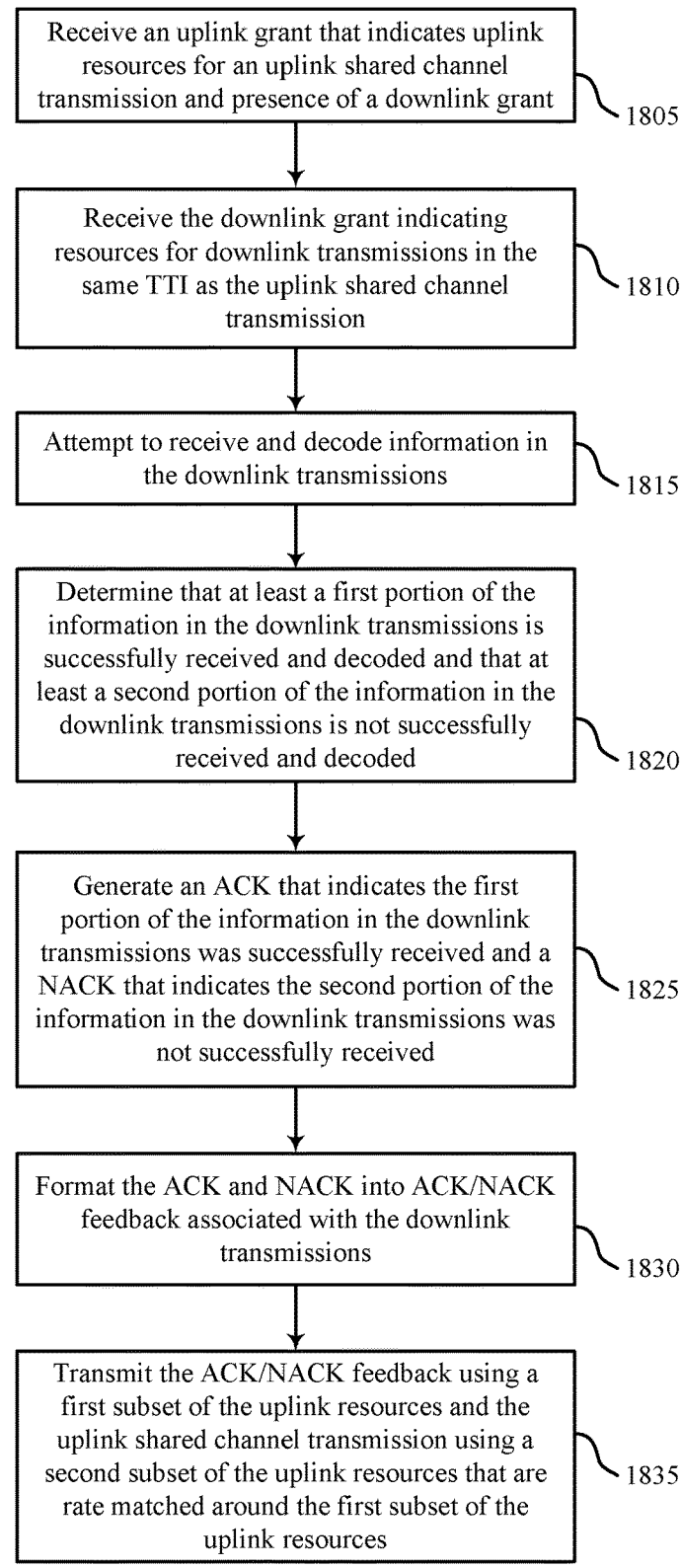

FIG. 18 shows a flowchart illustrating a method 1800 for acknowledgment of transmissions in accordance with various aspects of the present disclosure. The operations of method 1800 may be implemented by a device such as a UE 115 or its components as described with reference to FIGS. 1 and 2. For example, the operations of method 1800 may be performed by the UE acknowledgement manager as described herein. In some examples, the UE 115 may execute a set of codes to control the functional elements of the device to perform the functions described below. Additionally or alternatively, the UE 115 may perform aspects the functions described below using special-purpose hardware.

At block 1805, the UE 115 may receive an uplink grant that indicates uplink resources for an uplink shared channel transmission and a presence of a downlink grant in a same TTI as the uplink shared channel transmission as described above with reference to FIGS. 2 through 6. In certain examples, the operations of block 1805 may be performed by the uplink grant component as described with reference to FIGS. 12 and 13.

At block 1810, the UE 115 may receive the downlink grant, where the downlink grant indicates resources for downlink transmissions in the same TTI as the uplink shared channel transmission as described above with reference to FIGS. 2 through 6. In certain examples, the operations of block 1810 may be performed by the downlink grant component as described with reference to FIGS. 12 and 13.

At block 1815, the UE 115 may attempt to receive and decode information in the downlink transmissions as described above with reference to FIGS. 2 through 6. In certain examples, the operations of block 1815 may be performed by the decoder as described with reference to FIGS. 12 and 13.

At block 1820, the UE 115 may determine acknowledgment feedback for one or more of the downlink grant or a downlink transmission based on the uplink grant as described above with reference to FIGS. 2 through 6. In some cases, determining the acknowledgment feedback includes determining that at least a first portion of the information in the downlink transmissions is successfully received and decoded. In some cases, determining the acknowledgment feedback further includes determining that at least a second portion of the information in the downlink transmissions is not successfully received and decoded. In certain examples, the operations of block 1820 may be performed by the acknowledgment feedback component as described with reference to FIGS. 12 and 13.

At block 1825, the UE 115 may generate an ACK that indicates the first portion of the information in the downlink transmissions was successfully received as described above with reference to FIGS. 2 through 6. In some cases, the UE 115 may generate a NACK that indicates the second portion of the information in the downlink transmissions was not successfully received. In certain examples, the operations of block 1825 may be performed by the ACK generating component as described with reference to FIGS. 12 and 13.

At block 1830, the UE 115 may format the ACK and NACK into ACK/NACK feedback associated with the downlink transmissions as described above with reference to FIGS. 2 through 6. In certain examples, the operations of block 1830 may be performed by the feedback formatting component as described with reference to FIGS. 12 and 13.

At block 1835, the UE 115 may transmit the ACK/NACK feedback using a first subset of the uplink resources as described above with reference to FIGS. 2 through 6. In some cases, the UE 115 may transmit the uplink shared channel transmission using a second subset of the uplink resources that are rate matched around the first subset of the uplink resources. In certain examples, the operations of block 1835 may be performed by the acknowledgment feedback component as described with reference to FIGS. 12 and 13.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for acknowledgment of transmissions.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communication system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers (CCs)). A UE may be able to communicate with various types of base stations and network equipment including macro eNBs, small cell eNBs, relay base stations, and the like.

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communication systems 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for acknowledgment of transmissions. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

What is claimed is:

1. A method for wireless communication, comprising:
determining that a transmission time interval (TTI) includes downlink resources for a downlink transmission to a user equipment (UE) and uplink resources for an uplink shared channel transmission from the UE; and
transmitting an uplink grant to the UE indicating the uplink resources and indicating that the TTI includes the downlink transmission to the UE.

2. The method of claim 1, further comprising:
transmitting a downlink grant to the UE indicating the downlink resources;
transmitting the downlink transmission to the UE; and
monitoring for acknowledgment receipt feedback indicating successful receipt of one or more of the downlink grant, the uplink grant, or the downlink transmission.

3. The method of claim 2, wherein monitoring for the acknowledgment receipt feedback comprises:
monitoring an uplink control channel resource for acknowledgment receipt feedback indicating successful receipt of the downlink grant and unsuccessful receipt of the uplink grant; and
monitoring an uplink shared channel resource for acknowledgment receipt feedback indicating:
successful receipt of the uplink grant and one or more of the downlink grant or at least a portion of the downlink transmission, or
successful receipt of the uplink grant and unsuccessful receipt of the downlink grant.

4. The method of claim 3, further comprising:
configuring the UE with a fixed payload size for acknowledgment feedback transmitted using the uplink shared channel resource.

5. The method of claim 2, wherein monitoring for the acknowledgment receipt feedback comprises:
monitoring an uplink control channel resource of the TTI for acknowledgment receipt feedback indicating successful receipt of one or more of the downlink grant or the uplink grant; and
monitoring an uplink shared channel resource subsequent to the uplink control channel resource for successful receipt of the uplink grant at the UE.

6. A method for wireless communication, comprising:
receiving an uplink grant that indicates uplink resources for an uplink shared channel transmission and a presence of a downlink grant in a same transmission time interval (TTI) as the uplink shared channel transmission; and
determining acknowledgment feedback for one or more of the downlink grant or a downlink transmission based at least in part on the uplink grant.

7. The method of claim 6, further comprising:
transmitting the acknowledgment feedback; and
rate matching the uplink shared channel transmission around the acknowledgment feedback.

8. The method of claim 6, wherein determining the acknowledgment feedback comprises:
determining that the downlink grant is not successfully received; and
generating a negative acknowledgment (NACK) that indicates the downlink grant was not successfully received.

9. The method of claim 6, further comprising:
receiving the downlink grant, wherein the downlink grant indicates resources for downlink transmissions in the same TTI as the uplink shared channel transmission; and
attempting to receive and decode information in the downlink transmissions; and
wherein determining the acknowledgment feedback comprises:
determining that the information in the downlink transmissions is successfully received and decoded; and
generating an acknowledgment/negative-acknowledgment (ACK/NACK) that indicates the information in the downlink transmissions was successfully received.

10. The method of claim 9, further comprising:
transmitting the ACK/NACK using a first subset of the uplink resources; and
transmitting the uplink shared channel transmission using a second subset of the uplink resources that are rate matched around the first subset of the uplink resources.

11. The method of claim 9, wherein generating the ACK/NACK further comprises:
performing a cyclic redundancy check (CRC) on the ACK/NACK to identify CRC information; and
including the CRC information with the acknowledgment feedback.

12. The method of claim 6, wherein determining the acknowledgment feedback comprises:
identifying a first subset of the uplink resources for the acknowledgment feedback; and
identifying a second subset of the uplink resources that are rate matched around the first subset of the uplink resources.

13. The method of claim 12, wherein the first subset of the uplink resources are identified irrespective of an amount of data in the acknowledgment feedback.

14. The method of claim 6, wherein determining the acknowledgment feedback comprises:
identifying control channel resources for acknowledging receipt of the downlink grant and the downlink transmission in a first subframe;
determining that the downlink grant was not successfully received; and
transmitting a negative acknowledgment of the receipt of the downlink grant in the control channel resources or in the resources for the uplink shared channel transmission.

15. The method of claim 14, further comprising:
performing a listen-before-talk (LBT) procedure; and
transmitting the uplink shared channel transmission using the uplink resources indicated in the uplink grant.

16. An apparatus for wireless communication, comprising:
a processor;
memory in electronic communication with the processor; and
instructions stored in the memory and operable, when executed by the processor, to cause the apparatus to:
determine that a transmission time interval (TTI) includes downlink resources for a downlink transmission to a user equipment (UE) and uplink resources for an uplink shared channel transmission from the UE; and
transmit an uplink grant to the UE indicating the uplink resources and indicating that the TTI includes the downlink transmission to the UE.

17. The apparatus of claim 16, wherein the instructions are operable to cause the processor to:
transmit a downlink grant to the UE indicating the downlink resources;
transmit the downlink transmission to the UE; and
monitor for acknowledgment receipt feedback indicating successful receipt of one or more of the downlink grant, the uplink grant, or the downlink transmission.

18. The apparatus of claim 17, wherein the instructions are operable to cause the processor to:
monitor an uplink control channel resource for acknowledgment receipt feedback indicating successful receipt of the downlink grant and unsuccessful receipt of the uplink grant; and
monitor an uplink shared channel resource for acknowledgment receipt feedback indicating: successful receipt of the uplink grant and one or more of the downlink grant or at least a portion of the downlink transmission, or successful receipt of the uplink grant and unsuccessful receipt of the downlink grant.

19. The apparatus of claim 18, wherein the instructions are operable to cause the processor to:
configure the UE with a fixed payload size for acknowledgment feedback transmitted using the uplink shared channel resource.

20. The apparatus of claim 17, wherein the instructions are operable to cause the processor to:
monitor an uplink control channel resource of the TTI for acknowledgment receipt feedback indicating successful receipt of one or more of the downlink grant or the uplink grant; and
monitor an uplink shared channel resource subsequent to the uplink control channel resource indicating successful receipt of the uplink grant at the UE.

21. An apparatus for wireless communication, comprising:
a processor;
memory in electronic communication with the processor; and
instructions stored in the memory and operable, when executed by the processor, to cause the apparatus to:
receive an uplink grant that indicates uplink resources for an uplink shared channel transmission and a presence of a downlink grant in a same transmission time interval (TTI) as the uplink shared channel transmission; and
determine acknowledgment feedback for one or more of the downlink grant or a downlink transmission based at least in part on the uplink grant.

22. The apparatus of claim 21, wherein the instructions are operable to cause the processor to:
transmit the acknowledgment feedback; and
rate match the uplink shared channel transmission around the acknowledgment feedback.

23. The apparatus of claim 21, wherein the instructions are operable to cause the processor to:
determine that the downlink grant is not successfully received; and
generate a negative acknowledgment (NACK) that indicates the downlink grant was not successfully received.

24. The apparatus of claim 21, wherein the instructions are operable to cause the processor to:
receive the downlink grant, wherein the downlink grant indicates resources for downlink transmissions in the same TTI as the uplink shared channel transmission;
attempt to receive and decode information in the downlink transmissions;
determine that the information in the downlink transmissions is successfully received and decoded; and
generate an acknowledgment/negative-acknowledgment (ACK/NACK) that indicates the information in the downlink transmissions was successfully received.

25. The apparatus of claim 24, wherein the instructions are operable to cause the processor to:
transmit the ACK/NACK using a first subset of the uplink resources; and
transmit the uplink shared channel transmission using a second subset of the uplink resources that are rate matched around the first subset of the uplink resources.

26. The apparatus of claim 24, wherein the instructions are operable to cause the processor to:
perform a cyclic redundancy check (CRC) on the ACK/NACK to identify CRC information; and
include the CRC information with the acknowledgment feedback.

27. The apparatus of claim 21, wherein the instructions are operable to cause the processor to:
identify a first subset of the uplink resources for the acknowledgment feedback; and
identify a second subset of the uplink resources that are rate matched around the first subset of the uplink resources.

28. The apparatus of claim 27, wherein the first subset of the uplink resources are identified irrespective of an amount of data in the acknowledgment feedback.

29. The apparatus of claim 21, wherein the instructions are operable to cause the processor to:
identify control channel resources for acknowledging receipt of the downlink grant and the downlink transmission in a first subframe;
determine that the downlink grant was not successfully received; and
transmit a negative acknowledgment of the receipt of the downlink grant in the control channel resources or in the resources for the uplink shared channel transmission.

30. The apparatus of claim 29, wherein the instructions are operable to cause the processor to:
perform a listen-before-talk (LBT) procedure; and
transmit the uplink shared channel transmission using the uplink resources indicated in the uplink grant.

* * * * *